US011907676B1

(12) United States Patent
Pemberton

(10) Patent No.: US 11,907,676 B1
(45) Date of Patent: Feb. 20, 2024

(54) PROCESSING ORCHESTRATION FOR SYSTEMS INCLUDING DISTRIBUTED COMPONENTS

(71) Applicant: Amazon Technologies, Inc., Seattle, WA (US)

(72) Inventor: Joe Pemberton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 114 days.

(21) Appl. No.: 17/005,539

(22) Filed: Aug. 28, 2020

(51) Int. Cl.
*G06F 40/20* (2020.01)
*G06F 40/42* (2020.01)

(52) U.S. Cl.
CPC .............. *G06F 40/42* (2020.01); *G06F 40/20* (2020.01)

(58) Field of Classification Search
CPC .................................. G06F 40/42; G06F 40/20
See application file for complete search history.

(56) References Cited

U.S. PATENT DOCUMENTS

| | | | |
|---|---|---|---|
| 6,839,328 B2* | 1/2005 | Lau ..................... | H04L 69/324 370/252 |
| 9,173,071 B2* | 10/2015 | Kim .................. | H03M 13/6527 |
| 10,733,614 B2* | 8/2020 | Sapoznik ................ | H04L 67/20 |
| 10,791,176 B2* | 9/2020 | Phipps ................ | H04L 67/1095 |
| 10,810,996 B2* | 10/2020 | Willett .................... | G10L 15/16 |
| 11,037,555 B2* | 6/2021 | Kothari ................ | G06F 1/3203 |
| 11,087,748 B2* | 8/2021 | Skobeltsyn ............ | G10L 15/26 |
| 11,258,807 B2* | 2/2022 | Muddu .................. | G06N 5/022 |
| 2019/0311715 A1* | 10/2019 | Pfeffinger ............... | G06F 3/167 |

OTHER PUBLICATIONS

Chen, Yingying, Shanqing Hu, Xingming Li, Ce Wang, and Zhe Chen, "An Improved RUDP for Data Transmission in Embedded Real-time System", 2019, 2019 IEEE International Conference on Signal, Information and Data Processing (ICSIDP), 2019, pp. 1-5. (Year: 2019).*
Stonebraker, Michael, Uğur Çetintemel, and Stan Zdonik, "The 8 Requirements of Real-time Stream Processing", 2005, SIGMOD Record, vol. 34, No. 4, pp. 42-47. (Year: 2005).*
Suzuki, Jun, Yuki Hayashi, Masaki Kan, Shinya Miyakawa, Takashi Takenaka, Takuya Araki, and Masaru Kitsuregawa, "Victream: Computing Framework for Out-of-Core Processing on Multiple GPUs", Dec. 2017, Proceedings of the Fourth IEEE/ACM International Conference on Big Data Computing, pp. 179-188. (Year: 2017).*

* cited by examiner

*Primary Examiner* — Daniel C Washburn
*Assistant Examiner* — James Boggs
(74) *Attorney, Agent, or Firm* — Pierce Atwood LLP

(57) ABSTRACT

Techniques for implementing a streaming remote procedure call (RPC) mechanism using distributed processing components of a system are described. A first processing component sends a connect message to a second processing component. Thereafter, the first processing component sends different instances of data to the second processing component as the different instances of data are determined by the first processing component. The second processing component performs at least some processes as the second processing component receives the different instances of data. After the first processing component sends all relevant data to the second processing component, the first processing component sends a commit message to the second processing component. Based at least in part on receiving the commit message, the second processing component determines finishes its processing, and sends result data to the first processing component.

20 Claims, 22 Drawing Sheets

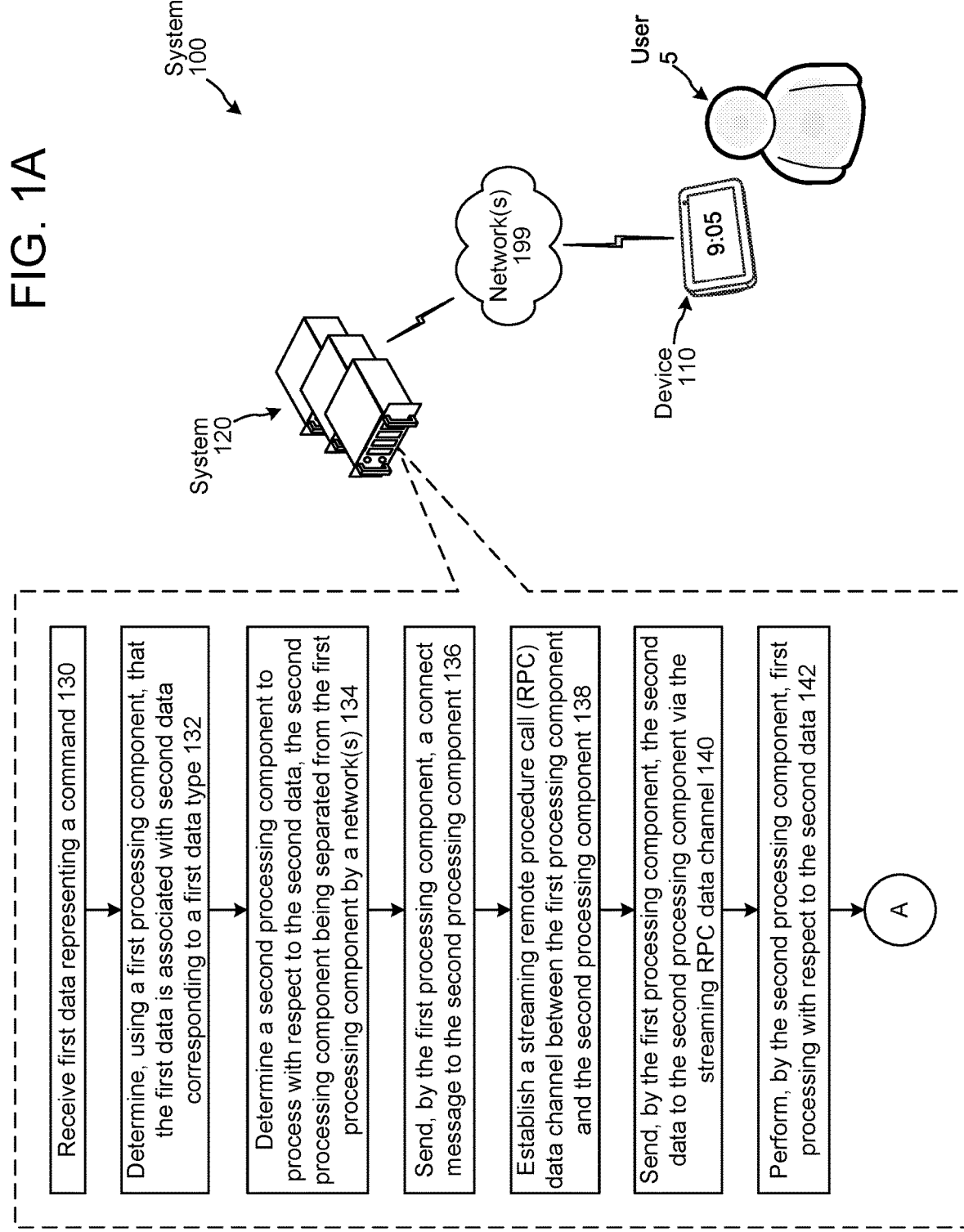

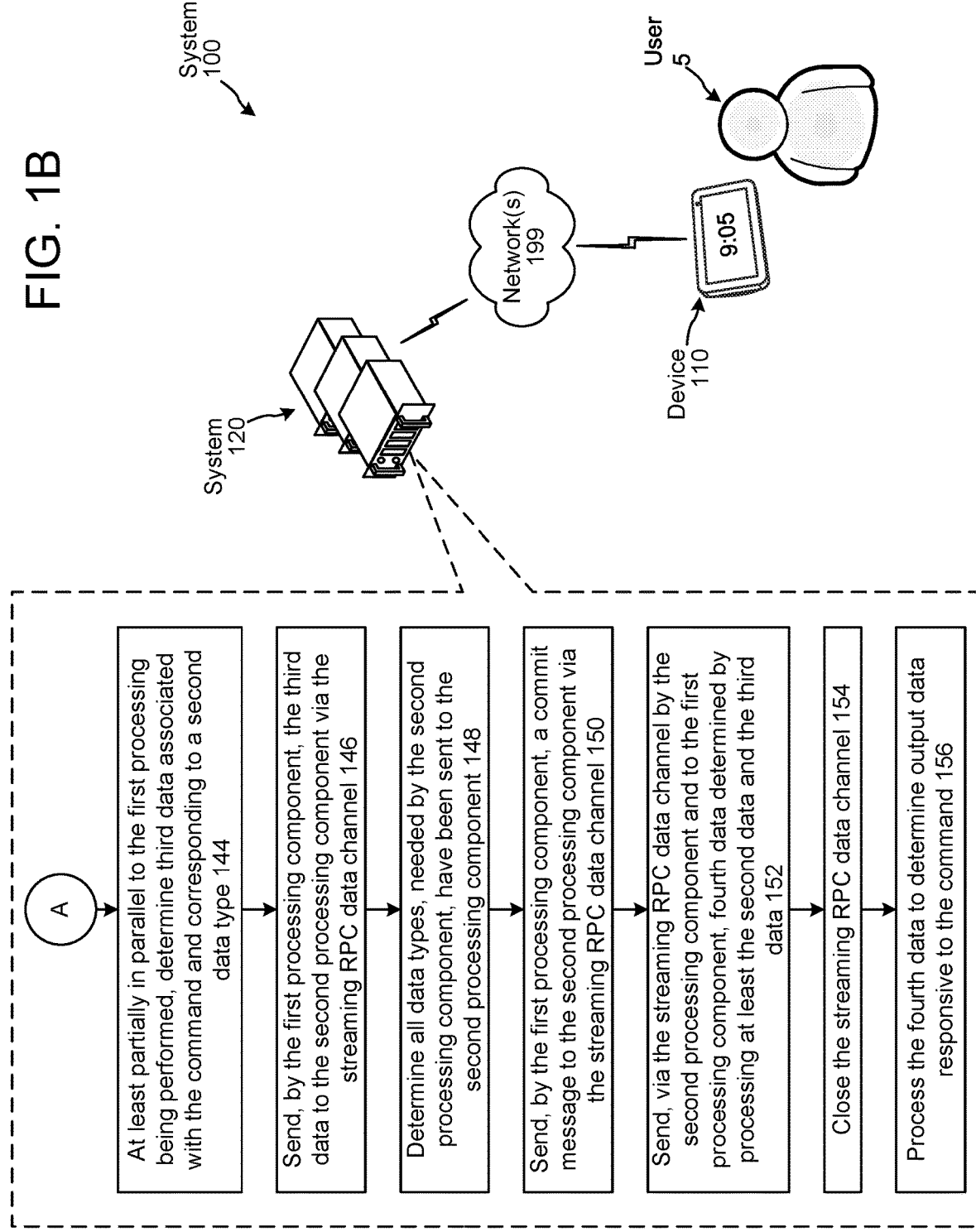

FIG. 8

| Node Identifier | Value | Input Connection Identifier(s) | Output Connection Identifier |
|---|---|---|---|
| adfds | First processing | mmnop | 5d5d3 |
| gf55 | Third processing | 92d83 | 33026 |
| jkj | Second processing | 33026; prpt | 00d1 |
| 289745 | Fourth processing | 5d5d3; 00d1 | pplj |

| Connection Identifier | Value | Outputting Node Identifier | Inputting Node Identifier |
|---|---|---|---|
| mmnop | First data type | ---- | adfds |
| 5d5d3 | First intermediate result data | adfds | 289745 |
| 92d83 | Third data type | ---- | gf55 |
| 33026 | Second intermediate result data | gf55 | jkj |
| prpt | Second data type | ---- | jkj |
| 00d1 | Third intermediate result data | jkj | 289745 |
| pplj | Overall processing result data | 289745 | ---- |

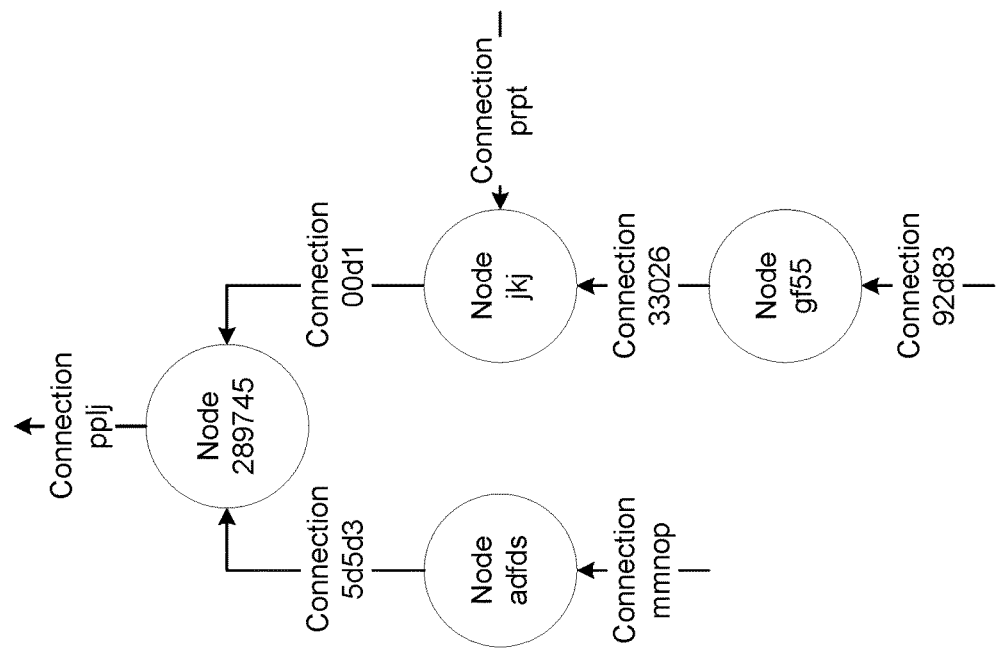

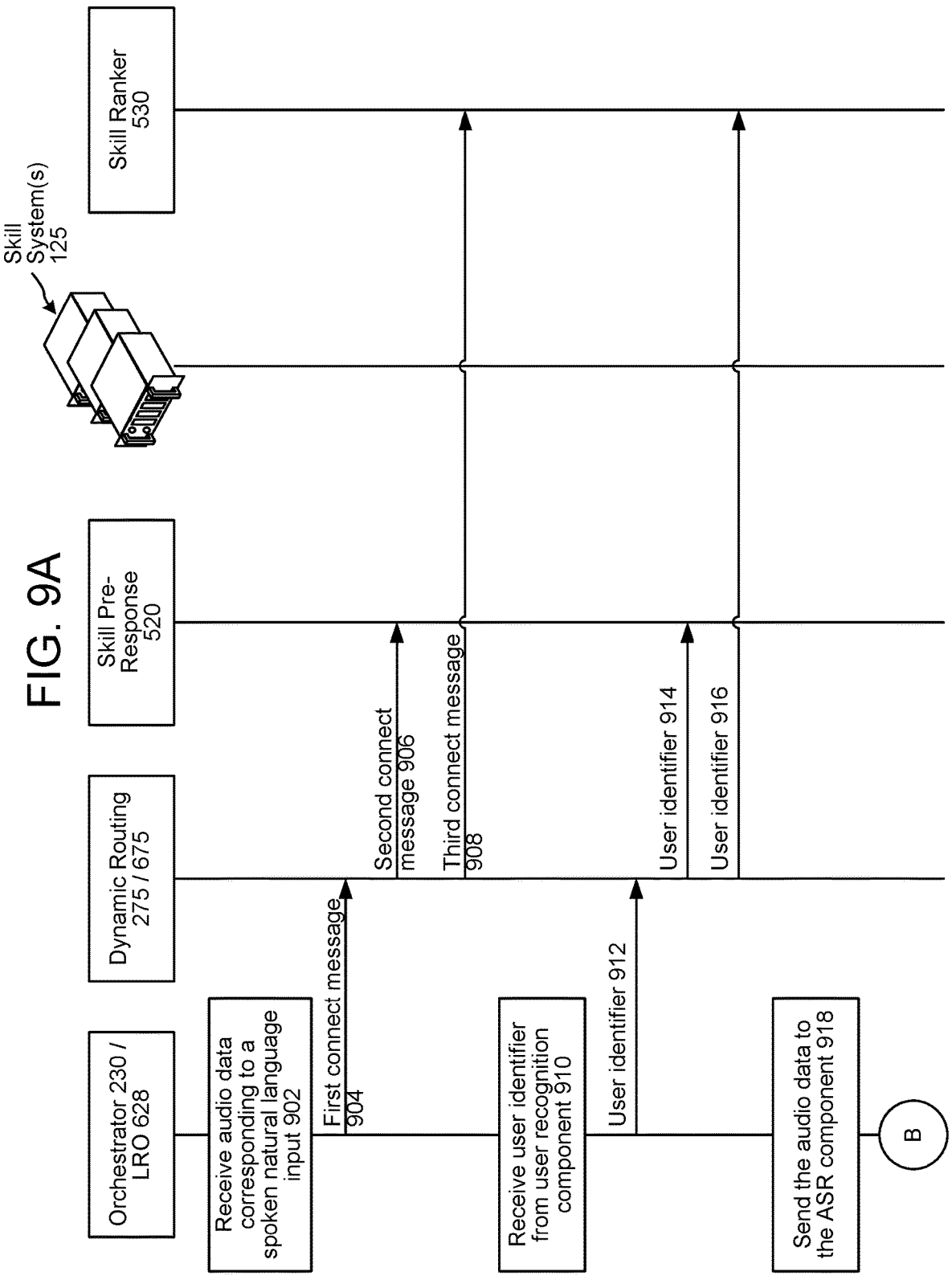

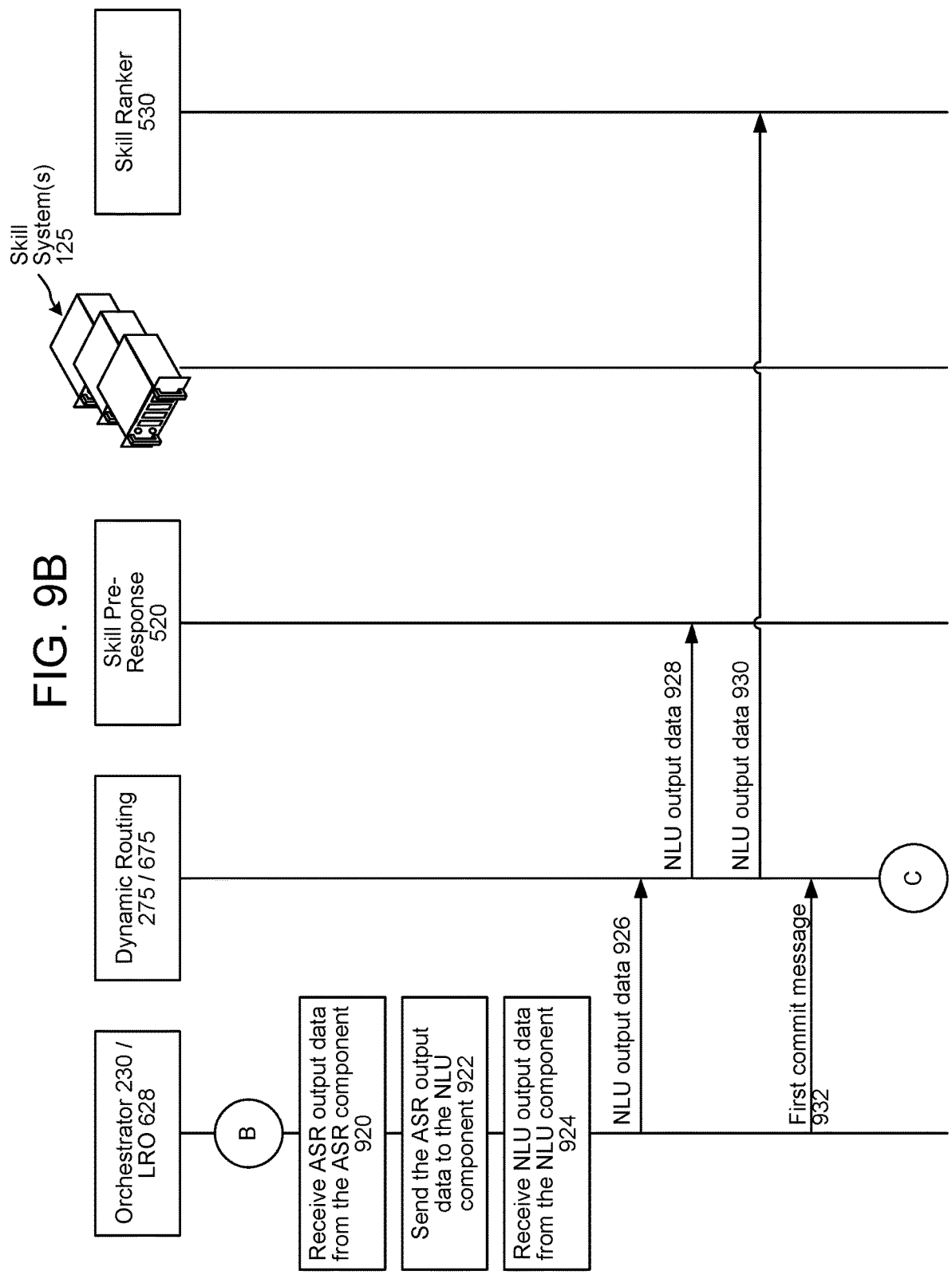

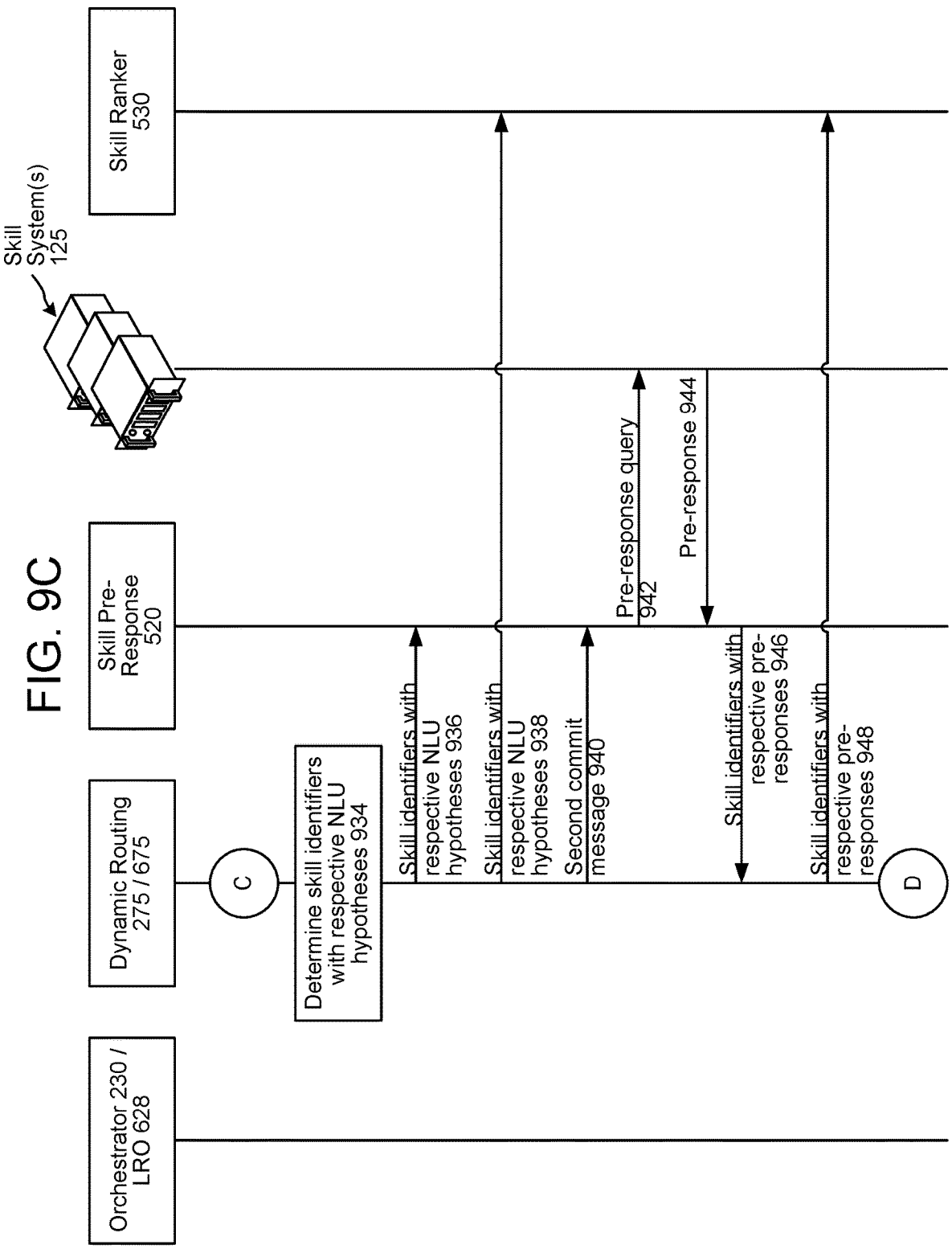

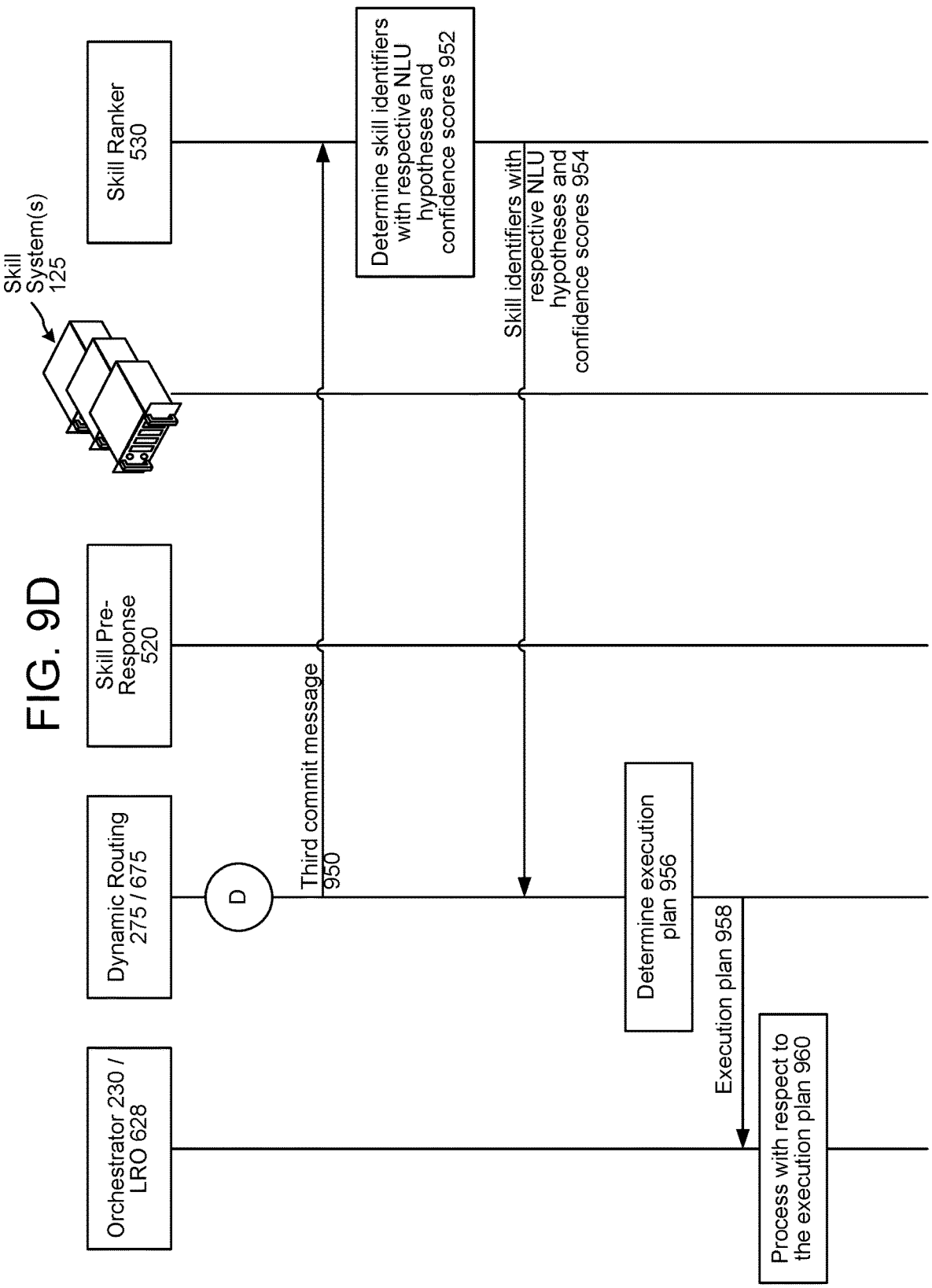

_US 11,907,676 B1_

PROCESSING ORCHESTRATION FOR SYSTEMS INCLUDING DISTRIBUTED COMPONENTS

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1B are a conceptual diagram illustrating a system configured to process a natural language input using a streaming data mechanism, according to embodiments of the present disclosure.

FIG. 8 is a conceptual diagram of an example execution graph and corresponding node and connection data, according to embodiments of the present disclosure.

FIGS. 9A-9D are a signal flow diagram illustrating how streaming RPC may be implemented by various components of a system at runtime, according to embodiments of the present disclosure.

DETAILED DESCRIPTION

Figure 2:
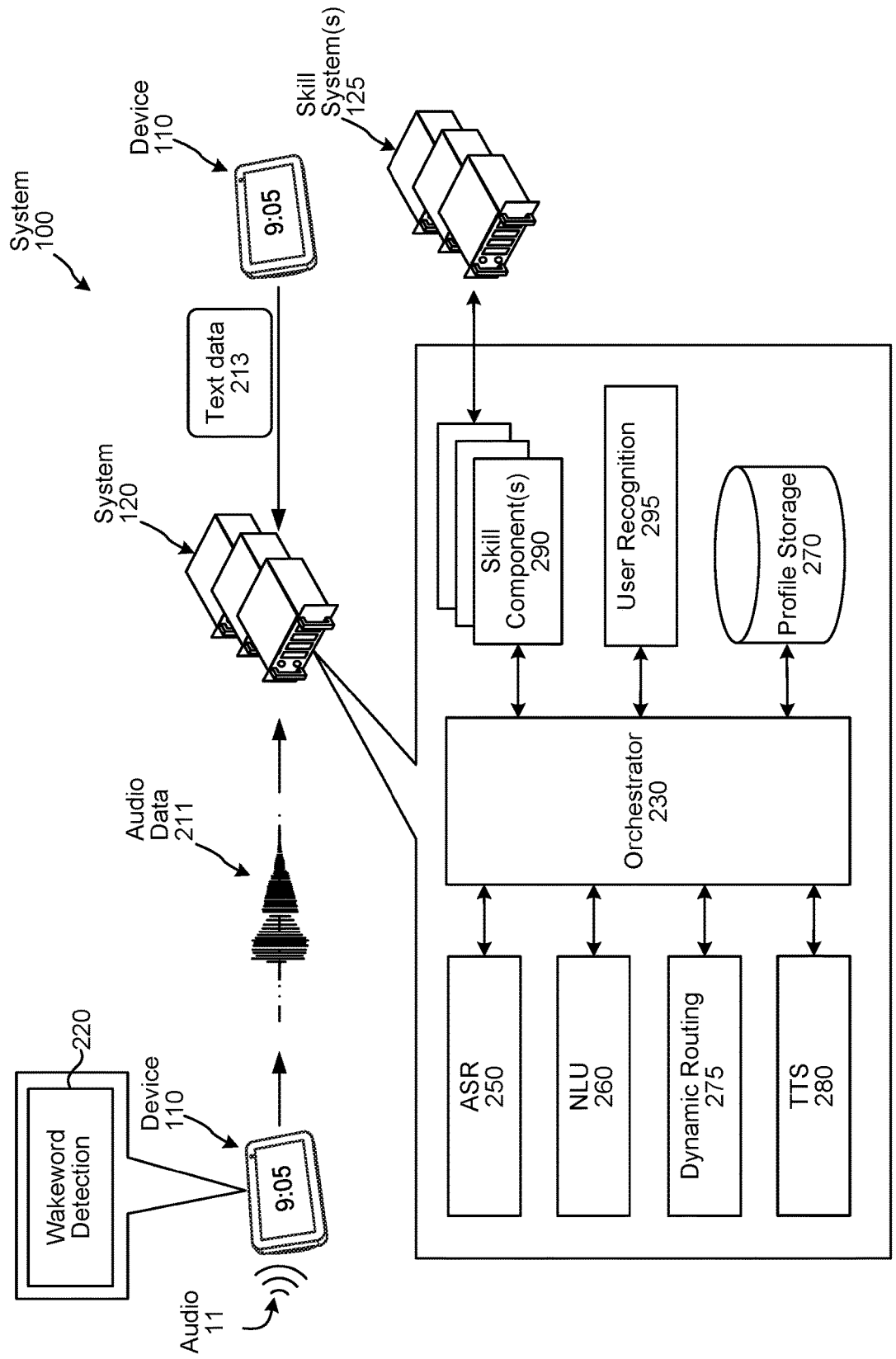
FIG. 2 is a conceptual diagram of components of a system, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech.

A system may be configured to cause actions to be performed in response to natural language inputs (e.g., spoken and/or text-based natural language inputs). For example, for the natural language input "play workout music," a system may output music from a user's workout playlist. For further example, for the natural language input "turn on the lights," a system may turn on "smart" lights associated with a user's profile. In another example, for the natural language input "play my favorite movie," a system may output a movie tagged as a favorite movie in a profile of the user. In the foregoing examples, actions correspond to the outputting of music, the turning on of "smart" lights, and the outputting of the movie. Thus, as used herein, an "action" may refer to a result of a system processing a natural language input.

A system's processing components (which one or both may or may not be machine learned processing components) may interact with each other by making remote procedure calls (RPCs). In distributed computing, RPC is when a first processing component causes a second processing component to execute one or more operations in a different address space (commonly on another computer on a shared network). For example, a system may include an orchestrator component distributed from a NLU component of the system, and the orchestrator component may make a RPC call to the NLU component that requests the NLU component perform named entity recognition (NER) processing, intent classification (IC) processing, etc.

RPC involves the first processing component sending, to the second processing component, various data types needed by the second processing component to perform the requested processing. Expanding on the foregoing example, the orchestrator component may send, as part of the RPC, ASR output data (representing a spoken natural language input) and a user identifier corresponding to a user that spoke the spoken natural language input.

A system may implement unary RPC in which a first processing component sends all data types, needed by the second processing component, at once/at the same time as part of the RPC. Using the foregoing example, unary RPC may involve the orchestrator component sending, to the NLU component, a single RPC that includes the ASR output data and the user identifier, and that requests the NLU component perform NER processing, IC processing, etc.

A unary RPC may be quite large, containing various data types needed by the second processing component to process. Moreover, some data types may become available to the first processing component sooner than other data types, and the second processing component may be able to perform at least some processing without having received all the data types to be sent to the second processing component. However, unary RPC gives the first processing component only one opportunity to send a RPC with all data types to the second processing component.

The present disclosure provides, among other things, techniques for orchestrating the processing of commands (e.g., natural language inputs) by distributed systems without requiring all data types, needed by a processing component, be sent to the processing component at once. For example, teachings of the present disclosure provide a streaming RPC mechanism by which a first processing component (which may or may not be a machine learned component) sends data types to a second processing component (which may or may not be a machine learned component) as the first processing component receives or otherwise determines the data types. Accordingly, various embodiments of the present disclosure enable the second processing component to process in parallel to other processing components of the system, rather than waiting to process until all needed data types are received by the second processing component. Such parallel processing may reduce user-perceived processing latency, and improve the user experience.

Some systems may impose processing time constraints on processing components. If a processing component is unable to process in the allotted amount of time, the processing component may timeout, thereby resulting in the system being unable to generate a response to the natural language input. By enabling a processing component to commence processing upon receiving a single data type, the amount of time needed by the processing component to process after receiving a last data type may be decreased. This saved amount of time may be re-allocated to the processing time constrain of a second processing component, thereby decreasing a likelihood of the second processing component timing out and/or thereby enabling the second processing component to perform more computationally expensive processes. Such may result in an improved user experience.

FIGS. 1A-1B illustrate a system 100 configured to process a natural language input using a streaming data mechanism. Although the figures and discussion of the present disclosure illustrate certain steps in a particular order, the steps described may be performed in a different order (as well as certain steps removed or added) without departing from the present disclosure. As shown in FIGS. 1A-1B, the system 100 may include a device 110 (local to a user 5) in communication with a system 120 across one or more networks 199. The network(s) 199 may include a local or private network, or may include a wide network such as the Internet. While the user 5 is illustrated as a human, other types of users (e.g., computing systems) may exist.

The system 120 receives (130) first data representing a command. For example, the device 110 may receive audio corresponding to a spoken natural language input (an example of a command) from the user 5. The device 110 may generate audio data representing the audio, and may send the audio data to the system 120. For further example, the device 110 may receive a text-based (e.g., typed) natural language input (an example of a command) from the user 5. The device 110 may generate text data representing the text-based natural language input, and may send the text data to the system 120. In another example, the device 110 may include (or otherwise be associated with) a camera that captures a sequence of images representing the user 5 performing a gesture (an example of a command). The device 110 may send image data (representing the sequence of images) and/or an indication of the gesture performed to the system 120. In a further example, the device 110 may include (or otherwise be associated with) a motion sensor configured to detect motion. When the device 110 detects motion (an example of a command), the device 110 may send data representing the detected motion to the system 120. In another example, the device 110 may include a button or display a virtual button, and the device 110 may detect the user 5 interacting with the button (an example of a command). The user 5 may interact with the button in various manners, such as a single quick press, a single long press, a double tap, a roaming touch input in a particular direction, etc. The device 110 may send data representing the detected button interaction to the system 120.

A first processing component (which may or may not be a machine learned component), of the system 120, may determine (132) that the first data is associated with second data corresponding to a first data type. For example, the first processing component may determine the first data is associated with a user identifier corresponding to the user 5 that provided the command.

The first processing component may determine (134) a second processing component (which may or may not be a machine learned component) to process with respect to the second data, with the second processing component communicating with the first processing component via one or more networks. In the example where the second data is a user identifier, the system 120 may determine a dynamic routing component 275 (described in detail herein below with respect to FIG. 5) is to process with respect to the user identifier. For example the first processing component may be an orchestrator component 230 that sends data to (and receives data from) the dynamic routing component 275 via one or more networks.

The first processing component may send (136) a connect message to the second processing component. As used herein, a message (including but not limited to a connect message) may be an instruction from one processing component to another processing component. In at least some embodiments, a message may contain data. In at least some embodiments, a message may be an instruction and include data.

The connect message represents, to the second processing component, that the first processing component will be sending the second processing component at least one data type to be processed with respect to the command. In at least some embodiments, the payload of the connect message (or metadata associated with the connect message) may include an identifier unique to the command (e.g., a command identifier).

In response to the connect message, a streaming RPC data channel is established (138) between the first processing component and the second processing component. In at least some embodiments, the streaming RPC data channel may be a Hypertext Transfer Protocol (HTTP) connection. As a result, all the data, sent between the first processing component and the second processing component with respect to the command (corresponding to the connect message) may be sent via the HTTP connection.

After sending the connect message and establishing the streaming RPC data channel, the first processing component may send (140) the second data to the second processing component via the streaming RPC data channel. The first processing component may send the second data in a data packet including the command identifier. Such enables the second processing component to know that the second data relates to the command (as opposed to another command presently being processed by the system 120).

Upon receiving the second data, the second processing component may perform (142) first processing with respect to the second data. At least partially in parallel to the first processing being performed, the system 120 may determine (144) third data associated with the command and corresponding to a second data type (different from the first data type of the second data). For example, the third data may be NLU output data 485 determined by a NLU component 260 (described in detail herein below with respect to FIGS. 3-4) of the system 120.

The first processing component may send (146) the third data to the second processing component via the streaming RPC data channel. The first processing component may send the third data in a data packet including the command identifier. Such enables the second processing component to know that the third data relates to the command (as opposed to another command presently being processed by the system 120).

After the third data is sent to the second processing component, the system 120 may determine (148) all data types, needed to be sent to the second processing component, have been sent to the second processing component. Such determination may be made in response to the third data (corresponding to the second data type) being sent to the second processing component, in response to a third data type being sent to the second processing component, or in response to an nth data type being sent to the second processing component.

After such determination has been made, the first processing component may send (150) a commit message to the second processing component via the streaming RPC data channel. The commit message represents, to the second processing component, that the first processing component has sent, to the second processing component, all data types needed by the second processing component. In at least some embodiments, the payload of the commit message (or metadata associated with the commit message) may include the command identifier to represent the commit message corresponds to the command received from the user 5 (as opposed to a different command presently being processed by the system 120).

After receiving the commit message, the second processing component may send (152), to the first processing component, fourth data determined by processing at least the second data and the third data. After sending the fourth data, the system 120 may close (154) the streaming RPC data channel between the first processing component and the second processing component. Additionally, after sending of the fourth data, the system 120 may process (156) the fourth data to determine output data responsive to the command.

The system 100 may operate using various components as illustrated in FIG. 2. The various components may be located on a same or different physical devices. Communication between various components may occur directly or across a network(s) 199.

A microphone or array of microphones (of or otherwise associated with the device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when the user 5 intends to speak an input to the system 120. The device 110 may be configured to detect various wakewords. In at least some examples, each wakeword may correspond to a different digital assistant. In at least some examples, a wakeword may correspond to a name of a digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMIMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio 11, to the system 120. The audio data 211 may include data corresponding to the detected wakeword, or the device 110 may remove the portion of the audio corresponding to the detected wakeword prior to sending the audio data 211 to the system 120.

The system 120 may include an orchestrator component 230 configured to receive the audio data 211 from the device 110. The orchestrator component 230 may send the audio data 211 to an ASR component 250.

The ASR component 250 transcribes the audio data 211 into ASR output data including one or more ASR hypotheses. ASR output data may include one or more textual interpretations (corresponding to one or more ASR hypotheses), or may be configured in another manner, such as one or more tokens. Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

Alternatively, the device 110 may receive a text-based (e.g., typed) natural language input. The device 110 may generate text data 213 representing the typed natural language input, and may send the text data 213 to the system 120, wherein the text data 213 is received by the orchestrator component 230.

Figure 3:
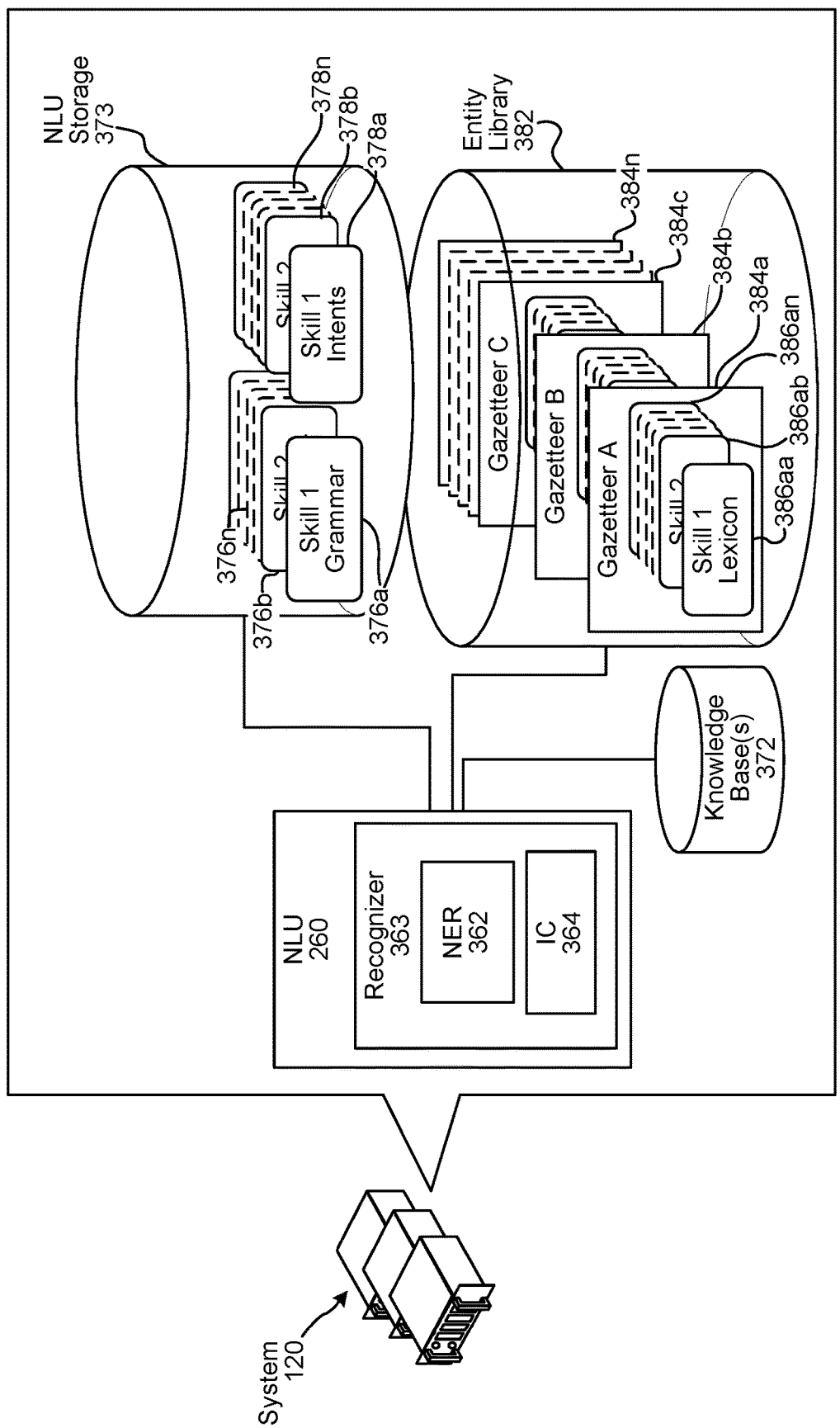
FIG. 3 is a conceptual diagram of how natural language understanding (NLU) processing may be performed, according to embodiments of the present disclosure.
Figure 4:
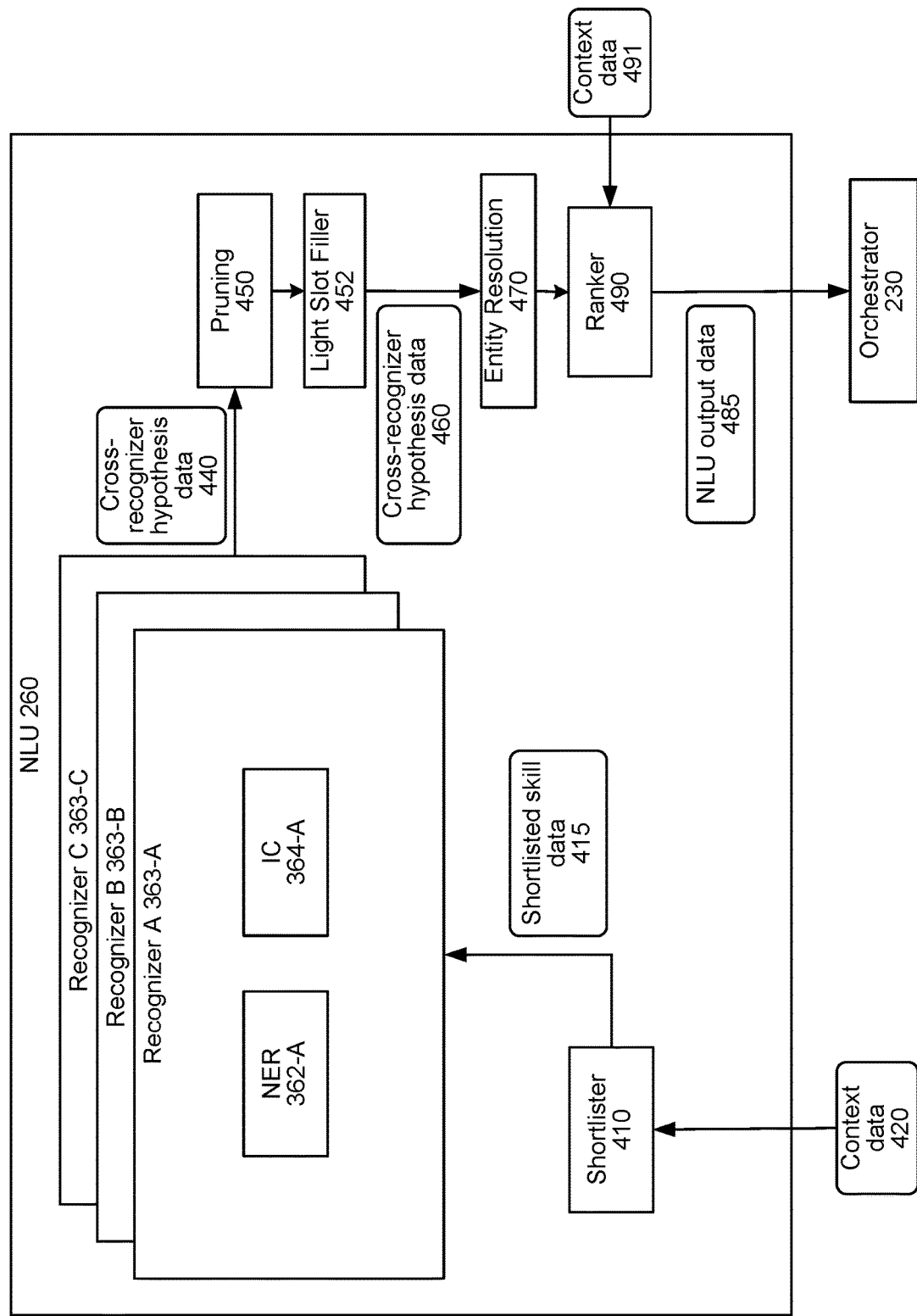
FIG. 4 is a conceptual diagram of how NLU processing may be performed, according to embodiments of the present disclosure.

The orchestrator component 230 may send the text data 213 or ASR output data output, depending on the type of natural language input received, to a NLU component 260. FIGS. 3-4 illustrate how the NLU component 260 may perform NLU processing. For reference, as used below, a "skill" may refer to a skill component 290, a skill system 125, or a combination of a skill component 290 and an associated skill system 125.

The NLU component 260 may include one or more recognizers 363. In at least some embodiments, a recognizer 363 may be associated with a skill (e.g., the recognizer may be configured to interpret a natural language input to correspond to the skill). In at least some other embodiments, a recognizer 363 may be associated with a domain (e.g., the recognizer may be configured to interpret a natural language input to correspond to the domain). A non-limiting list of domains includes a smart home domain, a music domain, a video domain, a flash briefing domain, a shopping domain, a communications domain, and a custom domain.

Recognizers 363 may process in parallel, in series, partially in parallel, etc. For example, a recognizer corresponding to a first skill may process at least partially in parallel to a recognizer corresponding to a second skill. For further example, a recognizer corresponding to a first domain may process at least partially in parallel to a recognizer corresponding to a second domain. In another example, a recognizer corresponding to a skill may process at least partially in parallel to a recognizer corresponding to a domain.

The NLU component 260 may communicate with an NLU storage 373 including skill grammars (376a-376n), representing how natural language inputs may be formulated to invoke skills, and skill intents (378a-378n) representing intents supported by respective skills. While not illustrated, the NLU storage 373 may also or alternatively include domain grammars, representing how natural language inputs may be formulated to invoke domains, and domain intents representing intents supported by respective domains.

Each recognizer 363 may be associated with a particular grammar 376, one or more particular intents 378, and a particular personalized lexicon 386 (stored in an entity library 382). A gazetteer 384 may include skill-indexed (or domain-indexed) lexical information associated with a particular user. For example, Gazetteer A (384a) may include skill-indexed (or domain-indexed) lexical information 386aa to 386an. A user's music skill (or music domain) lexical information might include album titles, artist names, and song names, for example, whereas a user's contact list skill (or contact list domain) lexical information might include the names of contacts. Since every user's music collection and contact list is presumably different, this personalized information may improve entity resolution.

Each recognizer 363 may include a named entity recognition (NER) component 362 that attempts to identify grammars and lexical information that may be used to construe meaning with respect to text data/ASR output data input therein. An NER component 362 identifies portions of text data/ASR output data that correspond to a named entity that may be recognizable by the system 120. An NER component 362 may also determine whether a word refers to an entity that is not explicitly mentioned in the text data/ASR output data, for example "him," "her," "it" or other anaphora, or the like.

An NER component 362 applies grammar models 376 and lexical information 386 associated with one or more skills (or one or more domains) to determine a mention of one or more entities in text data/ASR output data input therein. In this manner, an NER component 362 identifies "slots" (i.e., particular words in text data/ASR output data) that may be needed for later processing. An NER component 362 may also label each slot with a type (e.g., noun, place, city, artist name, song name, etc.).

Each grammar model 376 may include the names of entities (i.e., nouns) commonly found in natural language corresponding to a particular skill (or domain) to which the grammar model 376 relates, whereas lexical information 386 may be personalized to the user identifier output by a user recognition component 295 for the natural language input. For example, a grammar model 376 associated with a shopping skill (or domain) may include a database of words commonly used when people discuss shopping.

Each recognizer 363 may also include an intent classification (IC) component 364 that processes text data/ASR output data to determine an intent(s) of a skill(s) (or domain(s)) that potentially corresponds to the natural language input represented in the text data/ASR output data. An intent corresponds to an action to be performed that is responsive to the natural language input. An IC component 364 may communicate with a database 378 of words linked to intents. For example, a music intent database may link words and phrases such as "quiet," "volume off," and "mute" to a<Mute>intent. An IC component 364 identifies potential intents by comparing words and phrases in text data/ASR output data to the words and phrases in an intents database 378 associated with the skill(s) (or dimain(s)) that is associated with the recognizer 363 implementing the IC component 364.

The intents identifiable by a specific IC component 364 may be linked to one or more skill-specific (or domain-specific) grammar models 376 with "slots" to be filled. Each slot of a grammar model 376 corresponds to a portion of text data/ASR output data that an NER component 362 believes corresponds to an entity. For example, a grammar model 376 corresponding to a<PlayMusic>intent may correspond to sentence structures such as "Play {Artist Name}," "Play {Album Name}," "Play {Song name}," "Play {Song name} by {Artist Name}," etc. However, to make resolution more flexible, grammar frameworks models 376 may not be structured as sentences, but rather based on associating slots with grammatical tags.

For example, an NER component 362 may identify words in text data/ASR output data as subject, object, verb, preposition, etc. based on grammar rules and/or models prior to recognizing named entities in the text data/ASR output data. An IC component 364 (implemented by the same recognizer 363 as the NER component 362) may use the identified verb to identify an intent. The NER component 362 may then determine a grammar model 376 associated with the identified intent. For example, a grammar model 376 for a <PlayMusic>intent may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in the text data/ASR output data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data/ASR output data using heuristic grammar rules, or a model may be constructed using techniques such as hidden Markov models, maximum entropy models, log linear models, conditional random fields (CRF), and the like. For example, an NER component 362, implemented by a music skill or music domain recognizer 363, may parse and tag text data/ASR output data corresponding to "play mother's little helper by the rolling stones" as {Verb}: "Play," {Object}: "mother's little helper," {Object Preposition}: "by," and {Object Modifier}: "the rolling stones." The NER component 362 may identify "Play" as a verb based on a word database associated with the music skill or music domain, which an IC component 364 may determine corresponds to a<PlayMusic>intent. At this stage, no determination has been made as to the meaning of "mother's little helper" and "the rolling stones," but based on grammar rules and models, the NER component 362 has determined that these phrases relates to the grammatical object (i.e., entity).

The frameworks linked to the intent are then used to determine what database fields should be searched to determine the meaning of these phrases, such as searching a user's gazetteer 384 for similarity with the framework slots. For example, a framework for a <PlayMusic>intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (in the knowledge base 372). For example, if the text data/ASR output data corresponds to "play songs by the rolling stones," after failing to determine an album name or song name called "songs" by "the rolling stones," the NER component 362 may search a music skill (or music domain) vocabulary for the word "songs." In the alternative, generic words may be checked before the gazetteer information, or both may be tried, potentially producing two different results.

A recognizer 363 may tag text data/ASR output data to attribute meaning thereto. For example, a recognizer 363 may tag "play mother's little helper by the rolling stones" as: {skill} Music, {intent} Play Music, {artist name} rolling stones, {media type} SONG, and {song title} mother's little helper. For further example, a recognizer 363 may tag "play songs by the rolling stones" as: {domain} Music, {intent} Play Music, {artist name} rolling stones, and {media type} SONG.

As described above, more than one recognizer 363 may process with respect to text data/ASR output data representing a single natural language input. In such instances, each recognizer 363 may output at least one NLU hypothesis including an intent indicator (determined by an IC component 364 of the recognizer 363) and at least one tagged named entity (determined by an NER component 362 of the recognizer 363).

The NLU component 260 may include a shortlister component 410 (as illustrated in FIG. 4). The shortlister component 410 selects skills that may execute in response to the natural language input. The shortlister component 410 thus limits downstream, more resource intensive NLU processes to being performed with respect to skills that are likely to execute in response to the natural language input.

Without a shortlister component 410, the NLU component 260 may process text data/ASR output data with respect to every skill of (or in communication with) the system 120, either in parallel, in series, or using some combination thereof. By implementing a shortlister component 410, the NLU component 260 may process text data/ASR output data with respect to only skills that are likely to execute in response to the natural language input. This reduces total compute power and latency attributed to NLU processing.

The shortlister component 410 may include one or more trained models. The model(s) may be trained to recognize various forms of natural language inputs that may be received by the system 120. For example, during a training period, a skill may provide the system 120 with training data representing sample natural language inputs that may be used to invoke the skill. For example, a ride sharing skill may provide the system 120 with training data corresponding to "get me a cab to [location]," "get me a ride to [location]," "book me a cab to [location]," "book me a ride to [location]," etc. The one or more trained models, to be used by the shortlister component 410, may be trained using the training data to determine other potentially related natural language input structures that a user may try to use to invoke the skill. During training, the system 120 may query the skill regarding whether the determined other natural language input structures are permissible to be used to invoke the skill at runtime. The alternate natural language input structures may be derived by one or more trained models during model training and/or may be based on natural language input structures provided by different skills. The skill may also provide the system 120 with training data indicating grammar and annotations.

The system 120 may use the training data representing the sample natural language inputs, the determined related natural language input(s), the grammar, and the annotations to train a model that indicates when a runtime natural language input is likely to be handled by a skill. Each trained model of the shortlister component 410 may be trained with respect to a different skill. Alternatively, the shortlister component 410 may use one trained model per skill type, such as one trained model for weather skills, one trained model for ride sharing skills, etc.

The system 120 may use the sample natural language inputs provided by a skill, and related sample natural language inputs determined during training, as binary examples to train a model associated with the skill. For example, some sample natural language inputs may be positive training examples (e.g., natural language inputs that may be used to invoke the skill), while other sample natural language inputs may be negative training examples (e.g., natural language inputs that may not be used to invoke the skill).

As described above, the shortlister component 410 may include a different trained model for each skill or a different trained model for each skill type. Alternatively, the shortlister component 410 may include a single model that includes a portion trained with respect to characteristics (e.g., semantic characteristics) shared by all skills. The single model may also include skill-specific portions, with each skill-specific portion being trained with respect to a different skill. Implementing a single model with skill-specific portions may result in less latency than implementing a different trained model for each skill because the single model with skill-specific portions limits the number of characteristics processed on a per skill level.

The portion of the model, trained with respect to characteristics shared by more than one skill, may be clustered based on skill type. For example, a first portion may be trained with respect to weather skills, a second portion may be trained with respect to music skills, a third portion may be trained with respect to travel skills, etc.

Clustering may not be beneficial in every instance because clustering may cause the shortlister component 410 to output indications of only a portion of the skills that the natural language input may relate to. For example, a natural language input may correspond to "tell me about Tom Collins." If the model is clustered based on skill type, the shortlister component 410 may determine the natural language input corresponds to a recipe skill (e.g., a drink recipe) even though the natural language input may also correspond to an information skill (e.g., storing or otherwise having access to information about a person named Tom Collins).

Training the shortlister component 410 (and other machine learned components described herein) may require establishing a "ground truth" for the training examples input therein. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

A machine learned component may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

If the shortlister component 410 determines a natural language input is associated with multiple skills, only the recognizers 363 associated with those skills may be called to process with respect to the natural language input. The selected recognizers 363 may process in parallel, in series, partially in parallel, etc. For example, if the shortlister component 410 determines a natural language input relates to both a communications skill and a music skill, a recognizer 363 associated with the communications skill may process in parallel, or partially in parallel, with a recognizer 363 associated with the music skill.

The shortlister component 410 may make binary (e.g., yes/no, I/O, etc.) determinations regarding whether a skill corresponds to a natural language input. The shortlister component 410 may make such determinations using the one or more trained models described herein above. If the shortlister component 410 implements a single trained model for each skill, the shortlister component 410 may simply run the models that are associated with enabled skills as indicated in a profile (e.g., stored in a profile storage 270 described in further detail below) associated with the device 110 and/or user 5.

The shortlister component 410 may generate shortlisted skill data 415 (illustrated in FIG. 4) representing one or more skills that relate to the natural language input. The number of skills represented in the shortlisted skill data 415 is configurable. In an example, the shortlisted skill data 415 may indicate every skill of (or otherwise in communication with) the system 120 as well as represent, for each skill, whether the skill relates to the natural language input. In another example, instead of indicating every skill, the shortlisted skill data 415 may only indicate the skills that the shortlister component 410 determines relates to the natural language input. In yet another example, the shortlister component 410 may implement thresholding such that the shortlisted skill data 415 may indicate no more than a maximum number of skills that the shortlister component 410 determines relates to the natural language input.

In at least some embodiments, the shortlister component 410 may generate a score representing how likely a skill relates to a natural language input. In such embodiments, the shortlisted skill data 415 may only include identifiers of skills associated with scores satisfying a condition (e.g., meeting or exceeding a threshold score).

In the situation where the ASR component 250 outputs ASR output data including more than one ASR hypothesis, the shortlister component 410 may output different shortlisted skill data 415 for each ASR hypothesis. Alternatively, the shortlister component 410 may output a single instance of shortlisted skill data 415 that represents skills corresponding to the different ASR hypotheses.

As indicated above, the shortlister component 410 may implement thresholding such that the shortlisted skill data 415 may indicate no more than a threshold number of skills (e.g., may include no more than a threshold number of skill identifiers). If the ASR component 250 outputs ASR output data including more than one ASR hypothesis, the shortlisted skill data 415 may indicate no more than a threshold number of skills irrespective of the number of ASR hypotheses. Additionally or alternatively, the shortlisted skill data 415 may indicate no more than a threshold number of skills for each ASR hypothesis (e.g., indicating no more than five skills for a first ASR hypothesis, no more than five skills for a second ASR hypothesis, etc.).

If the shortlister component 410 implements a different trained model for each skill, the shortlister component 410 may generate a different confidence score for each skill-specific trained model that is run by the shortlister component 410. For example, if the shortlister component 410 runs the models of every skill of (or otherwise in communication with) the system 120, the shortlister component 410 may generate a respective confidence score for each skill of (or otherwise in communication with) the system 120. For further example, if the shortlister component 410 only runs models specific to skills that are indicated as enabled in a profile associated with the device 110 and/or user 5 (as stored in the profile storage 270), the shortlister component 410 may only generate a respective confidence score for each enabled skill. For further example, if the shortlister component 410 implements a single trained model with skill-specific portions, the shortlister component 410 generate a respective confidence score for each skill who's specifically trained portion is run. The shortlister component 410 may perform matrix vector modification to obtain confidence scores for skills.

An example of shortlisted skill data 415 including confidence scores may be represented as:
  Search skill, 0.67
  Recipe skill, 0.62
  Information skill, 0.57
As indicated, the confidence scores output by the shortlister component 410 may be numeric values. The confidence scores output by the shortlister component 410 may alternatively be binned values (e.g., high, medium, low).

The shortlister component 410 may consider context data 420 when determining which skills relate to a natural language input. The context data 420 may be embedded (e.g., character embedded using art known or proprietary techniques) prior to being input to the shortlister component 410.

The context data 420 may include usage history data associated with the device 110 and/or user 5. For example, a confidence score of a skill may be increased if natural language inputs captured by the device 110 and/or originating from the user 5 routinely relate to the skill. Conversely, a confidence score of a skill may be decreased if natural language inputs captured by the device 110 and/or originated from the user 5 rarely relate to the skill.

The context data 420 may indicate the skills that are enabled with respect to the device 110 and/or user 5 (e.g., as represented in the profile storage 270). The shortlister component 410 may use such context data 420 to determine which skill-specific trained models to run. That is, the shortlister component 410 may determine to only run the trained models associated with enabled skills. The shortlister component 410 may alternatively use such context data 420 to alter skill confidence scores represented in the shortlisted skill data 415. As an example, considering two skills, one enabled and another unenabled, the shortlister component 410 may run a first model (or model portion) specific to the unenabled skill as well as a second model (or model portion) specific to the enabled skill. The shortlister component 410 may initially determine a confidence score of 0.60 for each of the skills. The shortlister component 410 may then alter those confidence scores based on which skill is enabled. For example, the shortlister component 410 may increase the confidence score associated with the enabled skill and/or decrease the confidence score associated with the unenabled skill.

The context data 420 may indicate a type of the device 110. The type of the device 110 may represent the input/output capabilities of the device 110. For example, a device type may represent the device 110 includes a display, the device 110 is headless (e.g., displayless), the device 110 is a mobile device, the device 110 is a stationary device, the device 110 includes audio playback capabilities, the device 110 includes a camera, etc. The shortlister component 410 may use such context data 420 to determine which skill-specific trained models (or portions of a model) to run. For example, if the device 110 corresponds to a displayless device type, the shortlister component 410 may determine not to run trained models (or portions of a model) specific to skills that output video data. The shortlister component 410 may alternatively use such context data 420 to alter skill confidence scores represented in the shortlisted skill data 415. As an example, considering two skills, one that outputs audio data and another that outputs video data, the shortlister component 410 may run a first model (or first portion of a model) specific to the skill that generates audio data as well as a second model (or second portion of a model) specific to the skill that generates video data. The shortlister component 410 may initially determine a confidence score of 0.60 for each of the skills. The shortlister component 410 may then alter the original confidence scores based on the type of the device 110. For example, if the device 110 corresponds to a displayless device type, the shortlister component 410 may increase the confidence score associated with the skill that generates audio data and/or decrease the confidence score associated with the skill that generates video data.

The device type, represented in the context data 420, may represent output capabilities of a device 110 to be used to output a response to the user 5, which may not necessarily be the device 110 that captured the natural language input (or other type of command). For example, a displayless device 110 may receive a natural language input corresponding to "play Game of Thrones," and the system 120 may determine a smart TV, or other device including or otherwise associated with a display, is to be used to output multimedia content (e.g., audio and video) corresponding to the title "Game of Thrones."

The context data 420 may indicate a speed of the device 110, a location of the device 110, or other mobility data. For example, the device 110 may correspond to a vehicle including a display. If the vehicle is moving, the shortlister component 410 may decrease the confidence score associated with a skill that generates video data as it may be undesirable to output video content to the user 5 while in a moving vehicle. The vehicle may be configured to periodically send, to the system 120, data indicating whether the vehicle is in motion.

The context data 420 may indicate a currently invoked skill (e.g., a skill that was being used to output content to the user 5 when the device 110 received the natural language input or other command). For example, the user 5 may speak a first natural language input causing the system 120 to invoke a music skill to output music to the user 5. As the music is being output, the system 120 may receive a second natural language input. The shortlister component 410 may use such context data 420 to alter skill confidence scores represented in the shortlisted skill data 415. For example, the shortlister component 410 may run a first model (or a first portion of model) specific to the music skill as well as a second model (or second portion of a model) specific to a second skill. The shortlister component 410 may initially determine a confidence score of 0.60 for each of the skills. The shortlister component 410 may then alter the original confidence scores based on the music skill being invoked to output content while the second natural language input was received. Based on the music skill being invoked, the shortlister component 410 may increase the confidence score associated with the music skill and/or decrease the confidence score associated with the second skill.

The thresholding implemented with respect to the shortlisted skill data 415, and the different types of context data 420 considered by the shortlister component 410, are configurable.

The shortlister component 410 may cause the NLU component 260 to execute only a subset of the recognizers 363 associated with skills represented in the shortlisted skill data 415 as relating to the natural language input. If the shortlister component 410 generates the shortlisted skill data 415 to include confidence scores, the shortlister component 410 may cause the NLU component 260 to execute only recognizers 363 associated with skills associated with confidence scores satisfying (e.g., meeting or exceeding) a condition (e.g., a threshold confidence score).

The NLU component 260 may aggregate NLU hypotheses, output by multiple recognizers 363, into cross-recognizer hypothesis data 440 (illustrated in FIG. 4). Each NLU hypothesis may be associated with a respective score indicating a likelihood that the NLU hypothesis corresponds to the domain, skill(s), etc. associated with the recognizer 363 from which the NLU hypothesis was output. For example, the cross-recognizer hypothesis data 440 may be represented as, with each line corresponding to a different NLU hypothesis:

[0.95] Intent: <PlayMusic>AlbumName: GameOfThrones

[0.70] Intent: <PlayVideo>VideoTitle: GameOfThrones.

While the foregoing illustrates cross-recognizer hypothesis data 440 include two NLU hypotheses, it will be appreciated that the cross-recognizer hypothesis data 440 may include differing numbers of NLU hypotheses with departing from the present disclosure.

The NLU component 260 may send the cross-recognizer hypothesis data 440 to a pruning component 450, which sorts the NLU hypotheses according to their respective scores. The pruning component 450 may then perform score thresholding with respect to the cross-recognizer hypothesis data 440. For example, the pruning component 450 may select NLU hypotheses associated with scores satisfying (e.g., meeting and/or exceeding) a condition (e.g., a threshold score). The pruning component 450 may additionally or alternatively perform number of NLU hypothesis thresholding. For example, the pruning component 450 may select a threshold number of top-scoring NLU hypotheses represented in the cross-recognizer hypothesis data 440.

The pruning component 450 may generate cross-recognizer hypothesis data 460 including the selected NLU hypotheses. The purpose of the pruning component 450 is to create a reduced list of NLU hypotheses so that downstream, more resource intensive, processes may only operate on NLU hypotheses that most likely represent the natural language input.

The NLU component 260 may include a light slot filler component 452 that takes text data, represented in the NLU hypotheses output by the pruning component 450, and alters it to make the text data more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or "compact disc." The replaced text data is then included in the cross-recognizer hypothesis data 460.

The cross-recognizer hypothesis data 460 may be sent to an entity resolution component 470. The entity resolution component 470 can apply rules or other instructions to standardize labels or tokens in the NLU hypotheses represented in the cross-recognizer hypothesis data 460. The precise transformation may depend on the skill, domain, etc. to which a NLU hypothesis relates. For example, for a travel skill-specific NLU hypothesis, the entity resolution component 470 may transform text data corresponding to "Boston airport" to the standard "BOS" three-letter code referring to the airport. The entity resolution component 470 can refer to a knowledge base that is used to specifically identify the precise entity referred to in each slot of each NLU hypothesis represented in the cross-recognizer hypothesis data 460.

Specific intent/slot combinations may also be tied to a particular source, which may then be used to resolve the text data. Referring to the example natural language input "play songs by the stones," the entity resolution component 470 may reference a personal music catalog, user profile, or the like. The entity resolution component 470 may output NLU hypotheses, altered from the cross-recognizer hypothesis data 460, that include more detailed information (e.g., entity identifiers) about the specific entities mentioned in the slots and/or more detailed slot data that can eventually be used by a skill to perform an action responsive to the natural language input. The NLU component 260 may include multiple entity resolution components that are each specific to one or more different skills, domains, etc.

The NLU component 260 may include a ranker component 490 that assigns a particular score to each NLU hypothesis output by the entity resolution component 470. The ranker component 490 may alter the score of a particular NLU hypothesis based on whether the NLU hypothesis has unfilled slots. For example, if a first NLU hypothesis includes slots that are all filled/resolved, the ranker component 490 may assign the first NLU hypothesis a higher score than a second NLU hypothesis including at least one slot that is unfilled/unresolved by the entity resolution component 470.

The ranker component 490 may apply re-scoring, biasing, or other techniques. To do so, the ranker component 490 may consider not only the data output by the entity resolution component 470, but may also context data 491.

The context data 491 may indicate skill ratings or popularities. For example, if a skill has a high rating, the ranker component 490 may increase the score of a NLU hypothesis associated with that skill, and vice versa.

The context data 491 may indicate skills that have been enabled by the user 5. For example, the ranker component 490 may assign higher scores to NLU hypotheses associated with enabled skills than to NLU hypotheses associated with skills that have not been enabled by the user 5.

The context data 491 may indicate a system usage history (e.g., specific to the user 5), such as if the user 5 regularly invokes a particular skill or does so at particular times of day. The context data 491 may indicate a present date, a present time, a location of the device 110, weather data, a type of the device 110, user preferences, as well as other context data. For example, the ranker component 490 may consider when any particular skill is currently active with respect to the present user 5 and/or device 110 (e.g., music being output by the skill when the current natural language input is received).

The ranker component 490 may output NLU output data 485 including one or more NLU hypotheses. The NLU component 260 may send the NLU output data 485 to the orchestrator component 230.

As described above, the system 120 may perform speech processing using two different components (e.g., the ASR component 250 and the NLU component 260). In at least some embodiments, the system 120 may implement a spoken language understanding (SLU) component configured to process audio data 211 to generate NLU output data 485.

The SLU component may be equivalent to a combination of the ASR component 250 and the NLU component 260. Yet, the SLU component may process audio data 211 and directly generate the NLU output data 485, without an intermediate step of generating ASR output data. As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. The SLU component may output a most likely NLU hypothesis, or multiple NLU hypotheses associated with respective confidence or other scores (such as probability scores, etc.).

Figure 5:
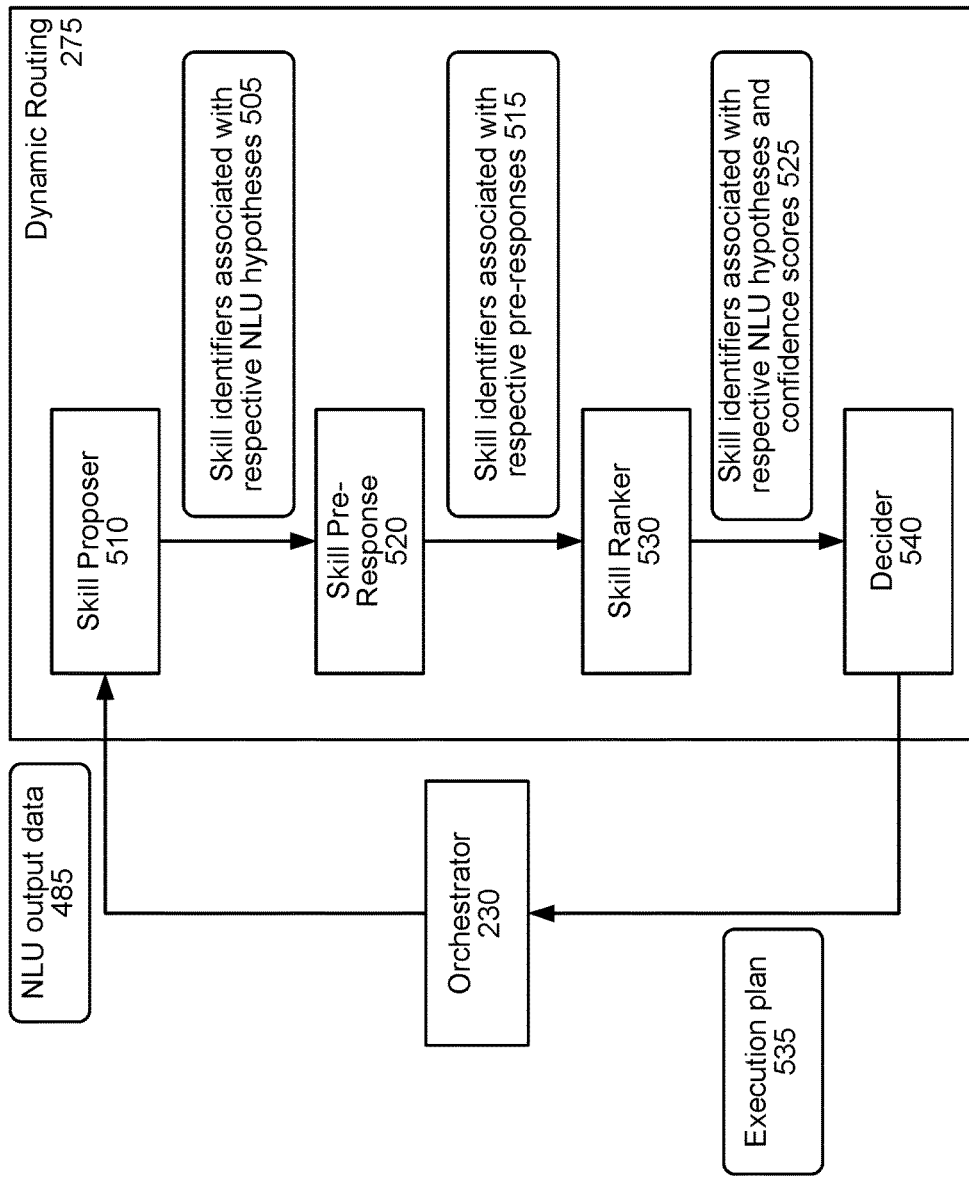
FIG. 5 is a conceptual diagram illustrating how the system may select a skill to respond to a command at runtime, according to embodiments of the present disclosure.

The system 120 may include a dynamic routing component 275 (illustrated in FIGS. 2 and 5). The dynamic routing component 275 may determine which NLU hypothesis most accurately represents the natural language input, as well as determine which skill is to execute in response to the natural language input.

As illustrated in FIG. 5, the dynamic routing component 275 may include a skill proposer 510 configured to determine skills capable of processing in response to the natural language input. The skill proposer 510 may receive NLU output data 485 representing the natural language input. The skill proposer 510 may also receive context data corresponding to the natural language input. For example, the context data may indicate (1) a skill that was causing the device 110 to output content (e.g., music, video, synthesized speech, etc.) when the device 110 captured the natural language input, (2) one or more skills that are indicated as enabled in a profile (as stored in the profile storage 270) associated with the user 5, (3) output capabilities (which may be represented as a device type identifier) of a device (which may or may not be the same device as the device 110 that captured the natural language input) to be used to output a response to the natural language input, (4) a geographic location of the device 110 (e.g., as represented in a profile in the profile storage 270), (5) an operation mode of the device to be used to output a response to the natural language input (e.g., data indicating whether the device presently corresponds to a "do not disturb" status, whether the device is enabled to be used for 1-way messaging functionality of the system 120, whether the device is enabled to be used for 2-way communication functionality of the system 120, whether the device is enabled to output announcement content, etc.), (6) ASR output data, (7) various user preferences, user profile data, and/or other context data available to the system 120 and corresponding to the natural language input.

The skill proposer 510 may determine skill proposal rules. A skill developer (via a skill developer device) may provide the system 120 with rules data, corresponding to one or more rules, representing when the skill developer's skill should be called to execute. In at least some embodiments, such a rule may be specific to an NLU intent. In such embodiments, if a skill system 125 is configured to execute with respect to multiple intents, the skill may be associated with more than one rule (e.g., each rule corresponding to a different intent capable of being handled by the skill). In addition to being specific to an intent, a rule may indicate one or more entities identifiable by an NER component 362, one or more entity identifiers capable of being output by the entity resolution component 470, and/or context to which a natural language input may correspond. For example, a rule may indicate output capabilities of a device, a geographic location, an operation mode of a device (e.g., that a device needs to be enabled to be used for 1-way messaging functionality of the system 120, that a device needs to be enabled to be used for 2-way communication functionality of the system 120, that a device needs to be enabled to output announcement content, etc.), and/or other context data. The system 120 may associate a skill's identifier with each rule corresponding to the skill. As an example, the system 120 may store rule data indicating a video skill may execute when a natural language input corresponds to a<PlayVideo>intent and the device (to be used to output a response to the natural language input) includes (or is otherwise associated with) a display. As another example, the system 120 may store rule data indicating a music skill may execute when a natural language input corresponds to a<PlayMusic>intent and music is being output by a device when the device captures a natural language input. It will be appreciated that other examples are possible. The foregoing rules enable skills to be selectively proposed at runtime (e.g., based on NLU entities, NLU entity resolution identifiers, and context data) in systems where multiple skills are configured to execute with respect to a same NLU intent.

The skill proposer 510 may, using the received context data and the foregoing described skill proposal rules, generate data 505 representing skills configured to process in response to the natural language input. Thus, in at least some embodiments, the skill proposer 510 may be implemented as a rules engine. In at least some embodiments, the skill proposer 510 may make binary (e.g., yes/no, true/false, etc.) determinations regarding whether a skill is configured to process in response to the natural language input. For example, the skill proposer 510 may determine a skill is configured to process, in response to the natural language input, if the skill is associated with a rule corresponding to the NLU output data 485 (e.g., corresponding to an intent (and optionally one or more entities and/or entity resolution identifiers) represented in the received NLU output data 485) and the received context data.

In at least some embodiments, the skill proposer 510 may generate data 505 representing such binary determinations made with respect to all skills implemented by (or otherwise in communication with) the system 120. In at least some embodiments, the skill proposer 510 may generate data 505 representing such binary determinations made with respect to only a portion of the skills implemented by (or otherwise in communication with) the system 120 (for example only skills indicated as enabled in the received context data).

The skill proposer 510 may output data 505 including skill identifiers and associated NLU output data. For example, each skill identifier, in the data 505, may be associated with one or more NLU hypotheses (represented in the NLU output data 485). The skill proposer 510 may simply make binary determinations (as described above); as such, the skill proposer 510 may not make any confidence determinations, and the skill identifiers may not be associated with confidence values in the data 505. An illustrative example of the data 505, that may be output by the skill proposer 510, may be represented as:

Skill Identifier: 1ds532 Intent: <PlayMusic>AlbumName: GameOfThrones
Skill Identifier: jfd1k828 Intent: <PlayVideo>VideoTitle: GameOfThrones
Skill Identifier: 434k1113 Intent: <PlayVideo>VideoTitle: GameOfThrones with the "Intent: <PlayMusic>Album Name: GameofThrones" and "Intent: <PlayVideo>VideoTitle: GameofThrones" portions of the data 505 corresponding to NLU output data.

In at least some embodiments, the shortlister component 410 (of the NLU component 260) and the skill proposer 510 may both be implemented by the system 120. In such instances, the shortlister component 410 and the skill proposer 510 may process with respect to different skills. For example, in at least some embodiments, the shortlister component 410 may process with respect to skill systems 125 in communication with the system 120 (e.g., illustrated in FIG. 2 as being outside of the system 120), and the skill proposer 510 may process with respect to skill components 290 implemented by the system 120 (e.g., illustrated in FIG. 2 as a component box within the system 120). In such embodiments, skill identifiers output by the shortlister component 410 (and associated NLU output data) may be merged with the skill identifiers and associated NLU output data (output by the skill component proposer 510), and the merged data may be input to a skill pre-response component 520 of the dynamic routing component 275. Alternatively, the skill identifiers and associated NLU output data (output by the shortlister component 410), and the skill identifiers and associated NLU output data (output by the skill proposer 510) may be separately sent to the skill pre-response component 520.

The data 505, output by the skill proposer 510, may be received by a skill pre-response component 520 of the dynamic routing component 275 (either directly or indirectly from the skill proposer 510). The skill pre-response component 520 may be configured to query skills for pre-responses. A pre-response may represent how a skill may process if called to respond to the natural language input, and may optionally include a variety of other data representing a strength of the skill's response. For example, a pre-response may indicate a skill can personalize a response using profile data accessible to the skill (and may indicate the types of profile data accessible); a pre-response may indicate a skill can respond but cannot personalize the response; a pre-response may indicate a user does not have a subscription with the skill, but that the skill can respond using free functionality of the skill; etc.

The skill pre-response component 520 may send a pre-response query to each skill associated with a skill identifier output by the skill proposer 520. The skill pre-response component 520 may determine, in the received data 505, a portion of NLU output data associated with a particular skill identifier. Thereafter, the skill pre-response component 520 may send, to a skill corresponding to the skill identifier, a pre-response query including the portion of the NLU output data associated with the skill's identifier.

A skill may determine, based on received NLU output data and other data available to the skill, whether the skill is able to respond to the natural language input. For example, a skill may generate a pre-response indicating the skill can respond to the natural language input, indicating the skill may be able to respond to the natural language input (e.g., the indicating the skill needs more data to determine whether the skill can respond to the natural language input), or indicating the skill cannot respond to the natural language input (e.g., due to the skill experiencing a high processing load).

In situations where a skill's pre-response indicates the skill can or may be able to respond to the natural language input, the pre-response may also include various other data representing a strength of the skill's potential response to the natural language input. For example, such other data may indicate capabilities (e.g., output capabilities or components such as availability of a connected screen, loudspeaker, etc.) of a device to be used to output the skill's response; pricing data corresponding to a product or service the natural language input is requesting be purchased (or is requesting purchase data for); availability of a product the natural language input is requesting be purchased; whether there are shipping fees for a product the natural language input is requesting be purchased; whether the user 5 already has a profile and/or subscription with the skill; that the user 5 does not have a subscription with the skill, but that there is a free trial/tier the skill is offering; with respect to a taxi skill, a cost of a trip based on start and end locations, how long the user 5 would have to wait to be picked up, etc.; and/or other data available to the skill that is related to the skill's processing of the natural language input. In at least some embodiments, a skill's pre-response may include a flag (or other indicator) representing a strength of the skill's ability to personalize its response to the user 5.

In at least some embodiments, a skill's pre-response may be configured to a schema pre-defined by the system 120. By the system 120 requiring pre-responses to conform to a specific schema (e.g., by requiring skills to only be able to provide certain types of data in pre-responses), the system 120 may onboard new skills into the dynamic routing functionality described herein without needing to reconfigure the dynamic routing component 275 each time a new skill is onboarded. Moreover, requiring pre-responses to conform to a schema limits the amount of values needed to be used to train and implement a machine learned model for ranking skills at runtime, as described herein below.

The skill pre-response component 520 may receive pre-response data from the queried skills. The skill pre-response component 520 may determine a portion of the received pre-response data corresponding to skills capable of responding to the natural language input. In other words, the skill pre-response component 520 may determine a portion of received pre-responses indicating the associated skill(s) can respond to the natural language input, or may be able to respond if the skill gets more data.

Thereafter, the skill pre-response component 520 may output data 515 including skill identifiers and associated pre-response. This data 515 may not include skill identifiers, and associated pre-responses, corresponding to skills that indicated they could not respond to the natural language input. Thus, a skill's pre-response, which indicates the skill cannot respond to the natural language input, may effectively operate as a way for the skill to prevent itself from being invoked at runtime to respond to the natural language input.

The data 515, output by the skill pre-response component 520, may be received by a skill ranker 530 of the dynamic routing component 275 (either directly or indirectly from the skill pre-response component 520). The skill ranker 530 may be configured to rank skills using a machine learned model. In at least some embodiments, the machine learned model may be built on a deep neural network (DNN).

At runtime the skill ranker 530 may receive the data 515 including skill identifiers and associated pre-responses. The skill ranker 530 may also receive context data corresponding to the natural language input. Such context data may indicate, for example, one or more user preferences of the user 5 (as represented in a user profile or group profile stored in the profile storage 270), one or more domains corresponding to the natural language input, one or more intents representing the natural language input, NER slot values as represented in the NLU output data 485, a measure of success of entity resolution performed with respect to the natural language input, text representing the natural language input, rankings of individual NLU hypotheses in the NLU output data 485, a type of the device 110 that received the natural language input, a type of the device 110 that is to be used to output a response to the natural language input, whether the device 110 (that received the natural language input) was outputting audio when the natural language input was received, whether the device 110 (that received the natural language input) was outputting video when the natural language input was received, and/or other context data available to the system 120.

Using a machine learned model, the skill ranker 530 may process the skill pre-responses and the context data to generate confidence scores for skills represented in the data 515 output by the skill pre-response component 520. Things that may increase a skill's ranking include, for example, that the skill is associated with a pre-response indicating the skill can generate a response (to the natural language input) that is personalized to the user 5, that an NLU hypothesis corresponding to the skill is ranked highly in the NLU hypotheses output by the NLU component 260, that the skill corresponds to a music skill and the device 110 was outputting music when the natural language input was received, that the skill corresponds to a video skill and the device 110 was outputting video when the natural language input was received, etc. Things that may decrease a skill's ranking include, for example, that the skill is associated with a pre-response indicating the skill cannot generate a response (to the natural language input) that is personalized to the user 5, that an NLU hypothesis corresponding to the skill is ranked low in the NLU hypotheses output by the NLU component 260, that the skill corresponds to a video skill and the device 110 was outputting music when the natural language input was received, that the skill corresponds to a music skill and the device 110 was outputting video when the natural language input was received, etc. Other examples are possible and will depend on the context data available to the skill ranker 530.

The skill ranker 530 may output data 525 including skill identifiers associated with respective NLU hypotheses and confidence scores. In at least some embodiments, the skill ranker 530's processing may affect scores (e.g., confidence scores) associated with the skill component identifiers, but not affect scores (e.g., confidence scores) generated by the NLU component 260. An illustrative example of the data 525, that may be output by the skill ranker 530, may be represented as:

[0.85] Skill Identifier: 12dfrads532 Intent: <PlayMusic>AlbumName: GameOfThrones

[0.62] Skill Identifier: jfd1k828 Intent: <PlayVideo>VideoTitle: GameOfThrones

[0.55] Skill Identifier: 434k1113 Intent: <PlayVideo>VideoTitle: GameOfThrones with the "Intent: <PlayMusic>Album Name: GameofThrones" and "Intent: <PlayVideo>VideoTitle: GameofThrones" portions of the data 525 corresponding to NLU hypotheses.

A decider component 540 (of the dynamic routing component 275) may receive the data 525 from the skill ranker 530 (either directly or indirectly). The decider component 540 is configured to generate an execution plan 535 based on the data 525. For example, an execution plan 535 may include the top ranked skill identifier and associated NLU hypothesis represented in the data 525, along with an instruction to invoke the skill (corresponding to the top-ranked skill identifier) to respond to the natural language input. In response to receiving such an execution plan 535, the orchestrator component 230 may invoke the skill (corresponding to the top-ranked skill identifier) by sending the NLU hypothesis to the skill along with an instruction to generate a response. For further example, an execution plan 535 may indicate further data is needed from the user 5 in order for the dynamic routing component 275 to adequately determine which skill should be invoked. In response to receiving such an execution plan 535, the orchestrator component 230 may engage the user 5 to gather the further needed data (e.g., by causing the device 110 to output synthesized speech and/or visual content requesting the further data, and the device 110 capturing one or more further natural language inputs corresponding to the further needed data). It will be appreciated that the foregoing are merely illustrative execution plans 535 and subsequent processing, and that the decider 540 may output other execution plans 535 causing other processing without departing from the present disclosure.

Referring again to FIG. 2, the system 120 may include one or more skill components 290 and/or may communicate with one or more skill systems 125 via one or more skill components 290. A skill component 290, skill system 125, and a combination of a skill component 290 and skill system 125 may be referred to herein as a "skill." A skill may be configured to execute with respect to NLU output data 485. For example, for an NLU hypothesis including a<GetWeather>intent, the system 120 (and more particularly the orchestrator component 230) may invoke a weather skill to determine and output weather information for a geographic location represented in a user profile or corresponding to a location of the device 110 that captured the corresponding natural language input. For further example, for an NLU hypothesis including a<BookRide>intent, the system 120 (and more particularly the orchestrator component 230) may invoke a taxi skill to book a requested ride. In another example, for an NLU hypothesis including a<BuyPizza>intent, the system 120 (and more particularly the orchestrator component 230) may invoke a restaurant skill to place an order for a pizza. A skill may operate in conjunction between the system 120 and other devices, such as the device 110, restaurant electronic ordering systems, taxi electronic booking systems, etc. in order to complete certain functions. Inputs to a skill may come from speech processing interactions or through other interactions or input sources.

A skill may be associated with a domain, a non-limiting list of which includes a smart home domain, a music domain, a video domain, a weather domain, a communications domain, a flash briefing domain, a shopping domain, and a custom domain.

The system 120 may include a TTS component 280 that generates audio data (e.g., synthesized speech) from text data using one or more different methods. Text data input to the TTS component 280 may come from a skill, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, retina data, etc.), received by the system 120 in correlation with a natural language input, to stored biometric data of users. The user recognition component 295 may additionally or alternatively perform user recognition by comparing image data (e.g., including a representation of at least a feature of a user), received by the system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition processing.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data. Data of a profile may additionally or alternatively include data representing a preferred assistant to respond to natural language inputs corresponding to the profile.

The profile storage 270 may include one or more user profiles. Each user profile may be associated with a different user identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language inputs. If a user does not enable a skill, the system 120 may not invoke the skill to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying data. A device profile may also include one or more user identifiers, corresponding to one or more user profiles associated with the device profile. For example, a household device's profile may include the user identifiers of users of the household.

Figure 6:
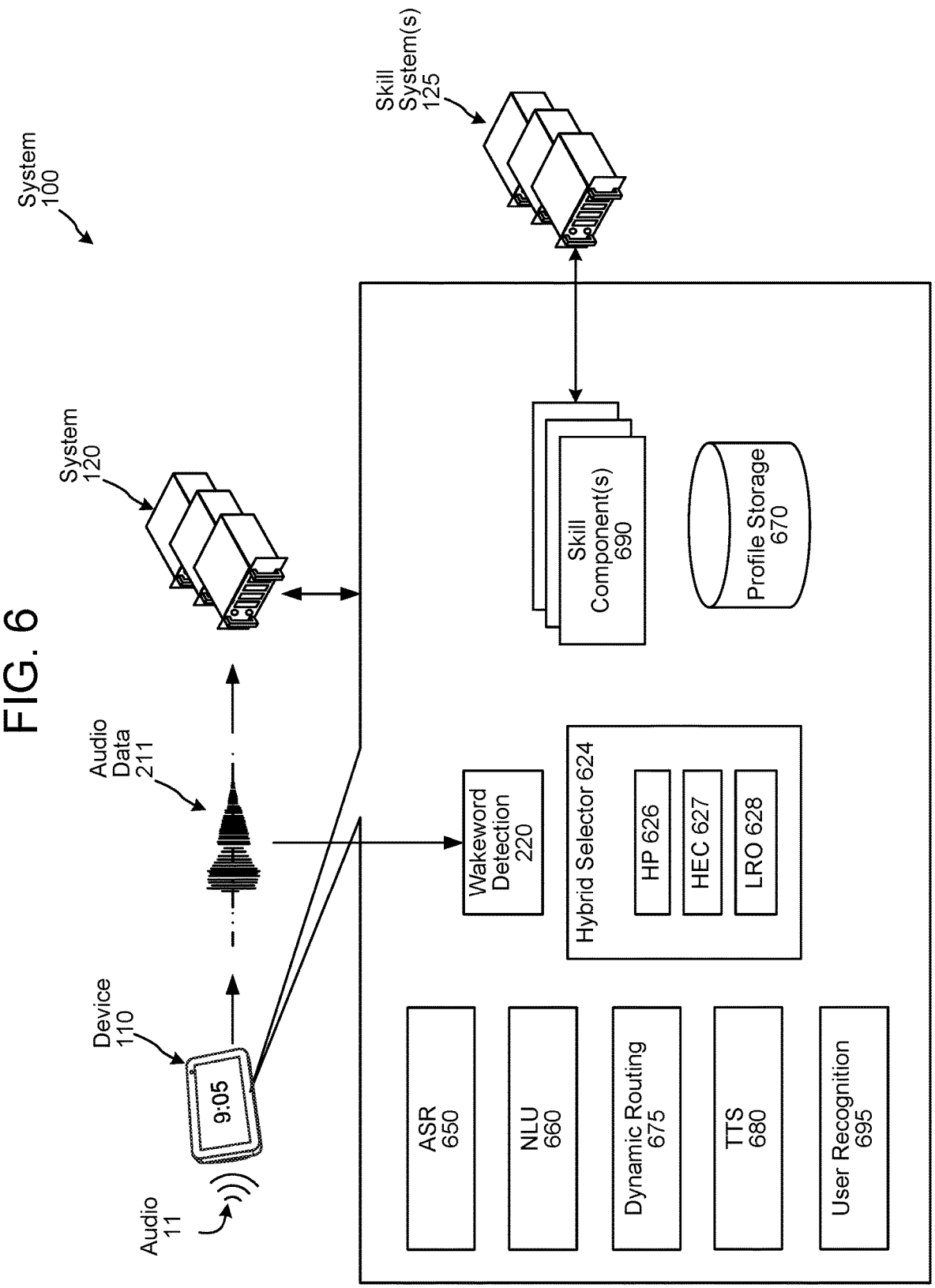
FIG. 6 is a conceptual diagram illustrating components that may be included in a device, according to embodiments of the present disclosure.

The foregoing describes illustrative components and processing of the system 120. In at least some embodiments, the device 110 may be configured to include some or all of the components, and perform some or all of the processing, of the system 120 described above. FIG. 6 illustrates such a configured device 110.

In at least some embodiments, the system 120 may receive the audio data 211 from the device 110, to recognize speech corresponding to a spoken input in the received audio data 211, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 680) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a nearby device (e.g., a directive to turn on a smart light). It is to be appreciated that the system 120 may be configured to provide other functions in addition to those discussed herein, such as, without limitation, providing step-by-step directions for navigating from an origin to a destination location, conducting an electronic commerce transaction on behalf of the user 5 as part of a shopping function, establishing a communication session between the user 5 and another user, and so on.

As noted with respect to FIG. 2, the device 110 may include a wakeword detection component 220 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 624, of the device 110, may send the audio data 211 to the wakeword detection component 220. If the wakeword detection component 220 detects a wakeword in the audio data 211, the wakeword detection component 220 may send an indication of such detection to the hybrid selector 624. In response to receiving the indication, the hybrid selector 624 may send the audio data 211 to the system 120 and/or the ASR component 650. The wakeword detection component 220 may also send an indication, to the hybrid selector 624, representing a wakeword was not detected. In response to receiving such an indication, the hybrid selector 624 may refrain from sending the audio data 211 to the system 120, and may prevent the ASR component 650 from further processing the audio data 211. In this situation, the audio data 211 can be discarded.

The device 110 may conduct its own speech processing using on-device language processing components, such as an ASR component 650 and an NLU 660, similar to the manner discussed above with respect to the ASR component 250 and the NLU component 260 of the system 120. The device 110 may also internally include, or otherwise have access to, other components such as one or more skill components 690 capable of executing commands based on NLU output data or other results determined by the device 110/system 120, a user recognition component 695 (configured to process in a similar manner to that discussed above with respect to the user recognition component 295 of the system 120), profile storage 670 (configured to store similar profile data to that discussed above with respect to the profile storage 270 of the system 120), or other components. In at least some embodiments, the profile storage 670 may only store profile data for a user or group of users specifically associated with the device 110. Similar to as described above with respect to FIG. 2, a skill component 690 may communicate with a skill system(s) 125.

In at least some embodiments, the on-device language processing components may not have the same capabilities as the language processing components of the system 120. For example, the on-device language processing components may be configured to handle only a subset of the natural language inputs that may be handled by the system 120. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the language processing results generated by the device 110 may indicate a low confidence or other metric indicating that the processing by the device 110 may not be as accurate as the processing done by the system 120.

The hybrid selector 624, of the device 110, may include a hybrid proxy (HP) 626 configured to proxy traffic to/from the system 120. For example, the HP 626 may be configured to send messages to/from a hybrid execution controller (HEC) 627 of the hybrid selector 624. For example, command/directive data received from the system 120 can be sent to the HEC 627 using the HP 626. The HP 626 may also be configured to allow the audio data 211 to pass to the system 120 while also receiving (e.g., intercepting) this audio data 211 and sending the audio data 211 to the HEC 627.

In at least some embodiments, the hybrid selector 624 may further include a local request orchestrator (LRO) 628 configured to notify the ASR component 650 about the availability of new audio data 211 that represents user speech, and to otherwise initiate the operations of local language processing when new audio data 211 becomes available. In general, the hybrid selector 624 may control execution of local language processing, such as by sending "execute" and "terminate" events/instructions. An "execute" event may instruct a component to continue any suspended execution (e.g., by instructing the component to execute on a previously-determined intent in order to generate a directive). Meanwhile, a "terminate" event may instruct a component to terminate further execution, such as when the device 110 receives directive data from the system 120 and chooses to use that remotely-generated directive data.

Thus, when the audio data 211 is received by the voice services component 622, the The HP 626 may allow the audio data 211 to pass through to the system 120 and the HP 626 may also input the audio data 211 to the on-device ASR component 650 by routing the audio data 211 through the HEC 627 of the hybrid selector 624, whereby the LRO 628 notifies the ASR component 650 of the audio data 211. At this point, the hybrid selector 624 may wait for response data from either or both of the system 120 or the local language processing components. However, the disclosure is not limited thereto, and in some examples the hybrid selector 624 may send the audio data 211 only to the local ASR component 650 without departing from the disclosure. For example, the device 110 may process the audio data 211 locally without sending the audio data 211 to the system 120.

The local ASR component 650 is configured to receive the audio data 211 from the hybrid selector 624, and to recognize speech in the audio data 211, and the local NLU component 660 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data that is generated by the local language processing component 640 components (and/or the system 120) may be formatted using an object-oriented programming language (such as JAVA), such as JavaScript object-oriented programming language syntax (such as JAVASCRIPT syntax), or JavaScript based object-oriented programming language-based syntax (such as JAVASCRIPT-based syntax). This may include formatting the directive using JavaScript Object Notation (JSON). In at least some embodiments, a device-generated directive may be serialized, much like how remotely-generated directives may be serialized for transmission in data packets over the network(s) 199. In at least some embodiments, a device-generated directive may be formatted as a programmatic Application Programming Interface (API) call with a same logical operation as a remotely-generated directive. In other words, a device-generated directive may mimic a remotely-generated directive by using a same, or a similar, format as the remotely-generated directive.

An NLU hypothesis (output by the NLU component 660) may be selected as usable to respond to a natural language input, and local response data may be sent (e.g., local NLU output data, local knowledge base information, internet search results, and/or local directive data) to the hybrid selector 624, such as a "ReadyToExecute" response. The hybrid selector 624 may then determine whether to use directive data from the on-device components to respond to the natural language input, to use directive data received from the system 120, assuming a remote response is even received (e.g., when the device 110 is able to access the system 120 over the network(s) 199), or to generate output audio requesting additional information from the user 5.

The device 110 and/or the system 120 may associate a unique identifier with each natural language input. The device 110 may include the unique identifier when sending the audio data 211 to the system 120, and the response data from the system 120 may include the unique identifier to identify which natural language input the response data corresponds.

In at least some embodiments, the device 110 may include, or be configured to use, one or more skill components 690 that may work similarly to the skill component(s) 290 implemented by the system 120. The skill component(s) 690 may correspond to one or more domains that are used in order to determine how to act on a spoken input in a particular way, such as by outputting a directive that corresponds to the determined intent, and which can be processed to implement the desired operation. The skill component(s) 690 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 690, a skill system 125, or a combination of a skill component 690 and a corresponding skill system 125.

In at least some embodiments, the streaming RPC mechanism of the present disclosure may be implemented when the device 110 and the system 120 each perform some processing with respect to a user input. For example, the streaming RPC mechanism may be used when ASR processing is performed on the device 110 but NLU processing and dynamic routing processing are performed by the system 120, or when ASR processing and NLU processing are performed on the device 110 but dynamic routing processing is performed by the system 120. For further example, the streaming RPC mechanism may be implemented when the device 110 performs ASR processing. As part of the ASR processing, the device 110 may determine incremental ASR processing confidences (e.g., may determine a new ASR processing confidence score each time the device 110 recognizes a new word in a user input). Rather than wait to send ASR output data to the system 120 after the device 110 determines a speech endpoint in incoming audio data, the device 110 may stream incremental ASR output data to the system 120 each time the device 110 computes a new ASR processing confidence. This would enable the device 110 to continue to perform ASR processing while the system 120, in parallel, may commence NLU processing (and other processing).

Figure 7:
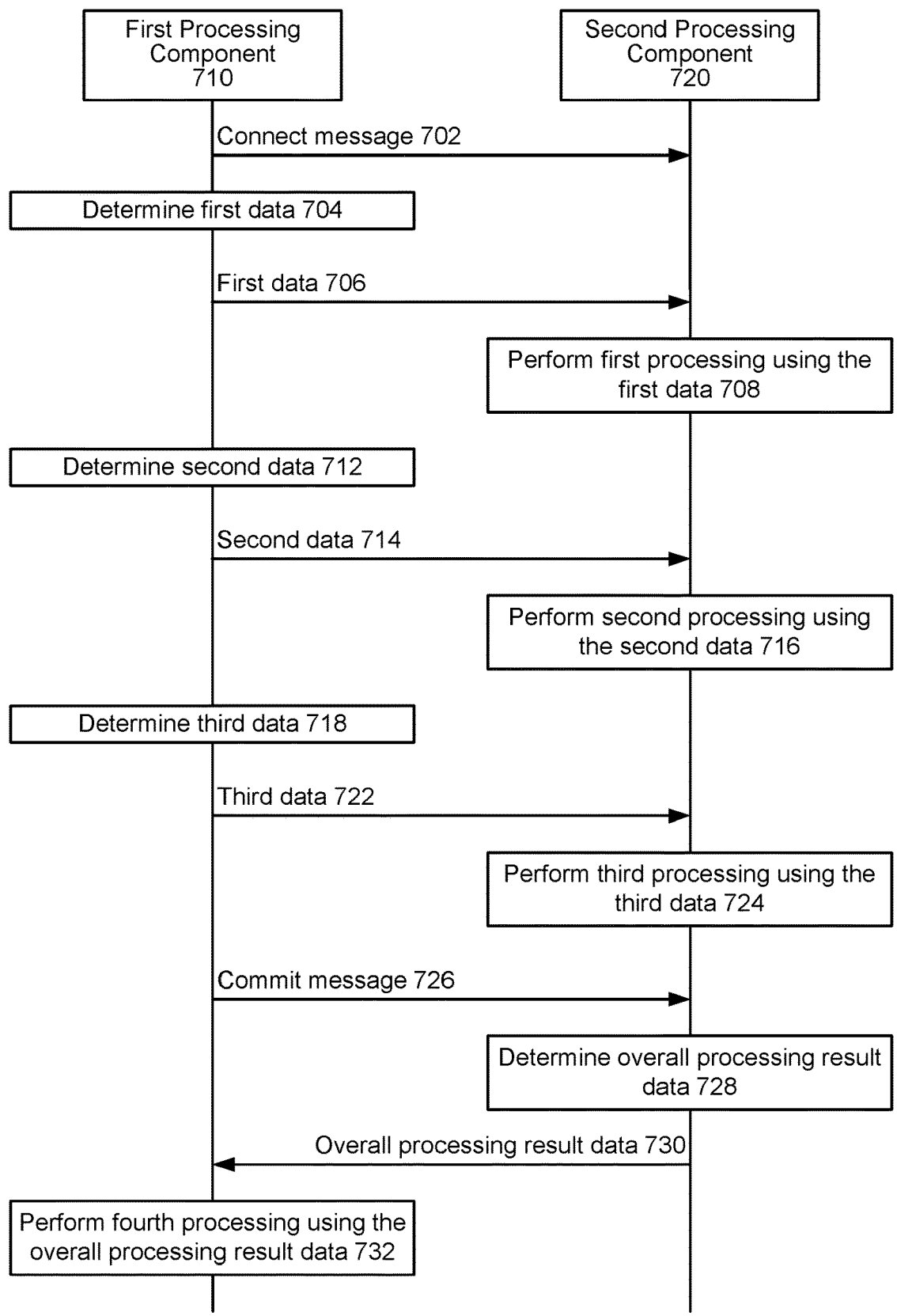
FIG. 7 is a signal flow diagram illustrating how two processing components of the system may execute a streaming remote procedure call (RPC) mechanism, according to embodiments of the present disclosure.

Now referring to FIG. 7, two processing components of the system 120 and/or the device 110 (i.e., the illustrated first processing component 710 and second processing component 720) may execute a streaming RPC mechanism to coordinate the sending of data (corresponding to different data types) between the first processing component 710 and the second processing component 720. The first processing component 710 and the second processing component 720 may be any processing components of the system 120 and/or device 110 provided the first processing component 710 and the second processing component 720 communicate through at least one network. As illustrated, a streaming RPC mechanism may begin with the first processing component 710 sending (702) a connect message to the second processing component 720. The connect message represents, to the second processing component 720, that the first processing component 710 will be sending the second processing component 720 at least one data type to be processed. The first processing component 720 may send the connect message after the first processing component 710 determines it needs to send one or more data types to the second processing component 720. In at least some embodiments, the payload of the connect message (or metadata associated with the connect message) may include an identifier unique to the command being processed (e.g., a command identifier).

In response to receiving the connect message, the second processing component 720 may authenticate and authorize the first processing component 710 to send data to the second processing component 720. For example, the connect call may include (or otherwise be associated with) a first processing component identifier, and the second processing component 720 may verify the first processing component identifier (which may be a signature/key). For further example, the second processing component 720, upon receiving the connect message, may determine whether the first processing component 710 is authorized to send data types to the second processing component 720, and receive overall processing result data from the second processing component 720. Moreover, in response to receiving the connect message, the second processing component 720 may allocate some of its resources to process data that is associated with the command identifier and received from the first processing component 710.

Sometime after sending (702) the connect message, the first processing component 710 may determine (704) first data (corresponding to a first data type, such as a user identifier, a device identifier, a device type, NLU output data, or some other type of data) that is to be processed by the second processing component 720. The first processing component 710 may determine (704) the first data by, for example, fetching the first data from storage or processing some data to generate the first data.

After determining (704) the first data, the first processing component 710 may send (706) the first data to the second processing component 720. The first processing component 710 may send (706) the first data in a data packet including the command identifier. Such enables the second processing component 720 to know to which command the first data relates (as the system 100 may process various commands at any particular time).

The second processing component 720 may be configured to receive various types of data and may perform various processes. A portion of the processes may be performed with respect to the first data type to which the first data corresponds. Thus, upon receiving the first data, the second processing component 720 may perform (708) first processing using the first data.

At least partially in parallel with the second processing component 720 performing (708) the first processing, the first processing component 710 may determine (712) second data (corresponding to a second data type) that is to be processed by the second processing component 720. The first processing component 710 may determine (712) the second data by, for example, fetching the second data from storage or processing some data to generate the second data.

After determining (712) the second data, the first processing component 710 may send (714) the second data to the second processing component 720. The first processing component 710 may send (714) the second data in a data packet including the command identifier. Upon receiving the second data, the second processing component 720 may perform (716) second processing using the second data.

At least partially in parallel with the second processing component 720 performing (716) the second processing, the first processing component 710 may determine (718) third data (corresponding to a third data type) that is to be processed by the second processing component 720. The first processing component 710 may determine (718) the third data by, for example, fetching the third data from storage or processing some data to generate the third data.

After determining (718) the third data, the first processing component 710 may send (722) the third data to the second processing component 720. The first processing component 710 may send (722) the third data in a data packet including the command identifier. Upon receiving the third data, the second processing component 720 may perform (724) second processing using the third data.

According to the foregoing, the first processing component 710 may send, to the second processing component 720, data as the first processing component 710 determines the data. While not illustrated in FIG. 7, at some point the first processing component 710 may determine the first processing component 710 has sent, to the second processing component 720, all data types needed by the second processing component 720. In response to such determination, the first processing component 710 may send (726) a commit message to the second processing component 720. The commit message represents, to the second processing component 720, that the first processing component 710 has sent all data the first processing component 710 intended to send to the second processing component 720, and that the first processing component 710 is awaiting a response from the second processing component 720. In at least some embodiments, the payload of the commit message (or metadata associated with the commit message) may include the command identifier.

In at least some embodiments, the sending of the connect message may result in the establishment of a Hypertext Transfer Protocol (HTTP) connection between the first processing component 710 and the second processing component 720. As a result, all the data, sent between the first processing component 710 and the second processing component 720 with respect to a single command corresponding to the connect message, may be sent via the HTTP connection. At any given instance, the first processing component 710 may be connected to the second processing component 720 via more than one HTTP connection, with each HTTP connection corresponding to data transmissions of a different command being processed by the system 100.

As detailed above, the second processing component 720 may perform processing using data as the second processing component 720 receives the data. In at least some instances, the second processing component 720 may determine results of such processing prior to receiving the commit message. For example, the second processing component 720 may, prior to receiving the commit message, generate first intermediate result data from the first processing of the first data. For further example, prior to receiving the commit message, the second processing component 720 may generate the first result data and second intermediate result data from the second processing of the second data. In another example, prior to receiving the commit message, the second processing component 720 may generate the first intermediate result data, second intermediate result data, and third intermediate result data from the third processing of the third data. As the second processing component 720 generates the intermediate result data, the second processing component 720 may store the intermediate result data in memory.

In at least some embodiments, the second processing component 720 may be configured to not complete its processing until it receives a commit message. In such embodiments, upon receiving the commit message, the second processing component 720 may fetch the intermediate result data from memory and determine (728) overall processing result data corresponding to an overall result of the processing performed by the second processing component 720. The second processing component 720 thereafter sends (730) the overall processing result data to the first processing component 710, which then performs (732) fourth processing using the overall processing result data.

In at least some embodiments, the second processing component 720 may be configured to complete its processing prior to receiving a commit message, but may be configured to not send the overall processing result data to the first processing component 710 until after the second processing component 720 has received the commit message. In such embodiments, the second processing component 720 may determine the overall processing result data, store the overall processing result data in memory and, upon receiving the commit message, may fetch the overall processing result data from memory and send same to the first processing component 710.

As used herein, "intermediate result data" may correspond to data, generated by processing performed by a processing component, that may be used by the processing component to perform further processing, or that may form a portion of data output by the processing component in response to receiving a commit message. As used herein, "overall processing result data" may correspond to data that represent a culmination of processing performed by a processing component, and which is output in response to the processing component receiving a commit message.

In at least some instances, when the second processing component 720 is configured to complete its processing prior to receiving a commit message, the second processing component 720 may nonetheless receive the commit message prior to determining the overall processing result data. In such instances, the second processing component 720 may send the overall processing result data to the first processing component 710 immediately upon generating the overall processing result data.

It has been described, with respect to FIG. 7, that three data types may be sent from the first processing component 710 to the second processing component 720 as part of a single RPC stream. However, the present disclosure is not limited thereto. That is, one or more different data types may be sent as part of a single RPC stream without departing from the present disclosure.

In at least some embodiments, the second processing component 720 may be configured to not determine the overall processing result data until after the second processing component 720 receives the commit message. Such configuration of the second processing component 720 may be beneficial, for example, when determination of the overall processing result data may produce one or more side effects (e.g., the charging of a payment method such as a credit card, the processing of sensitive data, the rendering of a response by a skill, etc.).

As described above, the second processing component 720 may determine various intermediate processing result data in parallel with the first processing component 710 sending data types to the second processing component 720.

In at least some instances, intermediate processing result data may be data that is to form a portion of the overall processing result data to be sent to the first processing component 710 for processing. According to at least some embodiments of the present disclosure, the second processing component 720 may send intermediate result data to the first processing component 710 upon the second processing component 720 determining the intermediate result data, rather than waiting to send the intermediate result data to the first processing component 710 as part of the overall processing result data. Such may enable the first processing component 710 to perform a portion of the fourth processing (described at step 732), corresponding to the sent intermediate data, in parallel with the second processing component 720 processing, rather than the first processing component 710 having to wait to receive the overall processing result data in order for the first processing component 710 to perform the portion of the fourth processing. The second processing component 720 may send the intermediate result data, to the first processing component 710, via a Hypertext Transfer Protocol (HTTP) connection that was established between the first processing component 710 and the second processing component 720 as a result of the connect message.

Although the first processing component 710 may send the same data types to the second processing component 720 for different commands (as the second processing component 720 may process the same type of data regardless of the command received by the system 100), the order in which data types are determined by the first processing component 710 and sent to the second processing component 720 may change from command to command. Thus, it may be beneficial to configure processes of the second processing component 720 such that the processes are not tied to any particular order in which data types are received. Accordingly, in at least some embodiments, the second processing component 720 may be configured to know what data types the second processing component 720 is capable of receiving, and know what processes of the second processing component 720 correspond to what data type, but the second processing component 720 may not be configured to impose requirements establishing a particular order in which the data types are sent to the second processing component 720. By configuring the second processing component 720 as such, the second processing component 720 is able to accommodate varying orders/sequences of data input.

In at least some embodiments, the second processing component 720 may accommodate varying orders/sequences of data inputs based on the second processing component 720 being configured to model its processing as an execution graph (such as, but not limited to, a directed acyclic graph (DAG)). The execution graph, of the second processing component 720, may be stored in memory and fetched by the second processing component 720 each time the second processing component 720 receives a connect message. Alternatively, the second processing component 720 may construct a new execution graph each time the second processing component 720 receives a connect message.

Each node of the execution graph, of the second processing component 720 may correspond to one or more different processes that produce(s) some value input one or more other nodes of the execution graph. In at least some embodiments, the execution graph, of the second processing component 720, may be stored as two tables of data. For example, one table may represent nodes of the execution graph, and the other table may represent node connections of the execution graph. Each entry in the node table may include, for example, a node identifier, identifiers of connections that connect to the node, and data describing a value (e.g., one or more processes) of the node. Each entry in the connection table may include, for example, a connection identifier, a node identifier corresponding to a node from which the connection points, a node identifier corresponding to a node to which the connection points, and data describing a function of the connection.

For example, FIG. 8 illustrates an example execution graph, and corresponding node and connection data, for the second processing component 720. As illustrated, the execution graph may include a nodes adfds, gf55, jkj, and 289745, and connections mmnop, 5d5d3, 92d83, 33026, prpt, 00d1, and pp1j. As illustrated by the directional arrows of the connections, node jkj is dependent on an output of processing performed with respect to node gf55, and node 289745 is dependent on outputs of processing performed with respect to nodes adfds and jkj.

As further illustrated in FIG. 8, a node table for the execution graph may include node data, for the node adfds, including a value representing node adfds corresponds to first processing, an input connection identifier mmnop, and an output connection identifier 5d5d3. The node table may also include node data, for the node gf55, including a value representing node gf55 corresponds to third processing, an input connection identifier 92d83, and an output connection identifier 33026. The node table may further include node data, for the node jkj, including a value representing node jkj corresponds to second processing, input connection identifiers 33026 and prpt, and an output connection identifier 00d1. The node table may additionally include node data, for the node 289745, including a value representing node 289745 corresponds to fourth processing, input connection identifiers 5d5d3 and 00d1, and an output connection identifier pp1j.

As further illustrated in FIG. 8, a connections table for the execution graph may include connection data, for the connection mmnop, including a value representing connection mmnop corresponds to a first data type, and an inputting node identifier adfds (representing connection mmnop is input to the node adfds). The connections table may also include connection data, for the connection 5d5d3, including a value of representing connection 5d5d3 corresponds to first intermediate result data, an outputting node identifier adfds (representing connection 5d5d3 is output from node adfds), and an inputting node identifier 289745. The connections table may further include connection data, for the connection 92d83, including a value of representing connection 92d83 corresponds to a third data type, and an inputting node identifier gf55. The connections table may additionally include connection data, for the connection 33026, including a value of representing connection 33026 corresponds to second intermediate result data, an outputting node identifier gf55, and an inputting node identifier jkj. The connections table may also include connection data, for the connection prpt, including a value of representing connection prpt corresponds to a second data type, and an inputting node identifier jkj. The connections table may further include connection data, for the connection 00d1, including a value of representing connection 00d1 corresponds to third intermediate result data, an outputting node identifier jkj, and an inputting node identifier 289745. The connections table may additionally include connection data, for the connection pp1j, including a value of representing connection pp1j corresponds to overall processing result data, and an outputting node identifier 289745.

Each time the second processing component 720 receives data from the first processing component 710, the second processing component 720 may perform as many processes, represented in the execution graph, as possible given the data already input to the second processing component 720. Thus, it will be appreciated that the second processing component 720 may iteratively perform processes, represented in the execution graph, as the second processing component 720 receives data (from the first processing component 710 and optionally one or more other processing components of the system 100).

Each time the second processing component 720 determines data by performing processes (referred to herein as "intermediate result data"), the second processing component 720 may store the intermediate result data in memory such that the intermediate result data can later be fetched from memory and processed as necessary when further data is received by the second processing component 720 (e.g., from the first processing component 710 and optionally one or more other processing components of the system 100).

The following is an example of how the streaming RPC mechanism of the present disclosure may be implemented by various components of the system 120/device 110. As illustrated in FIG. 9A, the orchestrator component 230/LRO 628 may receive (902) audio data corresponding to a spoken natural language input. Based at least in part on receiving the audio data, the orchestrator component 230/LRO 628 may send (904) a connect message to the dynamic routing component 275/675. In at least some embodiments, the connect message may include a natural language input identifier (an example of a command identifier) associated with the audio data (i.e., corresponding to the spoken natural language input). In at least some other embodiments, the connect message may be associated with metadata including the natural language input identifier.

Based at least in part on receiving the connect message from the orchestrator component 230/LRO 628, the dynamic routing component 275/675 may send (906) a connect message to the skill pre-response component 520. In at least some embodiments, the connect message may include a natural language input identifier. In at least some other embodiments, the connect message may be associated with metadata including the natural language input identifier.

In at least some embodiments, upon the orchestrator component 230/LRO 628 receiving a portion of the audio data corresponding to a spoken wakeword, the orchestrator component 230/LRO 628 may send the portion of the audio data to the user recognition component 295/695 for user recognition processing. Thereafter, the orchestrator component 230/LRO 628 may receive (910) a user identifier from the user recognition component 295/695, with the user identifier corresponding to a most likely user that spoken the wakeword.

After receiving the user identifier, the orchestrator component 230/LRO 628 may send (912) the user identifier to the dynamic routing component 275/675. While not illustrated, the orchestrator component 230/LRO 628 may also send, to the dynamic routing component 275/675, the natural language input identifier corresponding to the spoken natural language input.

After receiving the user identifier from the orchestrator component 230/LRO 628, the dynamic routing component 275/675 may send (914) the user identifier to the skill pre-response component 520. While not illustrated, the dynamic routing component 275/675 may also send, to the skill pre-response component 520, the natural language input identifier corresponding to the spoken natural language input.

Moreover, after receiving the user identifier from the orchestrator component 230/LRO 628, the dynamic routing component 275/675 may send (916) the user identifier to the skill ranker 530. While not illustrated, the dynamic routing component 275/675 may also send, to the skill ranker 530, the natural language input identifier corresponding to the spoken natural language input.

At least partially in parallel to at least some of processes 902-916 being performed, the orchestrator component 230 may send (918) the audio data to the ASR component 250/650, and thereafter receive (920) ASR output data from the ASR component 250/650. Thus, it will be appreciated that the dynamic routing component 275/675, the skill pre-response component 520, and/or the skill ranker 530 may perform processing using the user identifier at least partially in parallel with the ASR component 250/650 performing ASR processing on the audio data of the spoken natural language input.

The orchestrator component 230/LRO 628 may send (922) the ASR output data to the NLU component 260/660, and thereafter receive (924) NLU output data from the NLU component 260/660. In at least some instances, the dynamic routing component 275/675, the skill pre-response component 520, and/or the skill ranker 530 may not have completed processing using the user identifier prior to ASR processing of the audio data (of the spoken natural language input) being completed. In such instances, the dynamic routing component 275/675, the skill pre-response component 520, and/or the skill ranker 530 may perform processing using the user identifier at least partially in parallel with the NLU component 260/660 performing NLU processing on the ASR output data corresponding to the spoken natural language input.

The orchestrator component 230/LRO 628 may send (926) the NLU output data to the dynamic routing component 275/675. While not illustrated, the orchestrator component 230/LRO 628 may also send, to the dynamic routing component 275/675, the natural language input identifier corresponding to the spoken natural language input. For example, the orchestrator component 230/LRO 628 may send the natural language input identifier in metadata associated with the NLU output data.

After receiving the NLU output data from the orchestrator component 230/LRO 628, the dynamic routing component 275/675 may send (928) the NLU output data to the skill pre-response component 520. While not illustrated, the dynamic routing component 275/675 may also send, to the skill pre-response component 520, the natural language input identifier corresponding to the spoken natural language input. For example, the dynamic routing component 275/675 may send the natural language input identifier in metadata associated with the NLU output data.

Moreover, after receiving the NLU output data from the orchestrator component 230/LRO 628, the dynamic routing component 275/675 may send (930) the NLU output data to the skill ranker 530. While not illustrated, the dynamic routing component 275/675 may also send, to the skill ranker 530, the natural language input identifier corresponding to the spoken natural language input. For example, the dynamic routing component 275/675 may send the natural language input identifier in metadata associated with the NLU output data.

After sending the NLU output data to the dynamic routing component 275/675, the orchestrator component 230/LRO 628 may determine the orchestrator component 230/LRO 628 has sent all data types, to the dynamic routing component 275/675, that the orchestrator component 230/LRO 628 was configured to send to the dynamic routing component 275/675. Based at least in part on this determination, the orchestrator component 230/LRO 628 may send (932) a commit message to the dynamic routing component 275/675. In at least some embodiments, the commit message may include the natural language input identifier corresponding to the spoken natural language input. In at least some other embodiments, the commit message may be sent with associated metadata including the natural language input identifier.

Based at least in part on receiving the commit message from the orchestrator component 230/LRO 628, the dynamic routing component 275/675 (and more particularly the skill proposer 510 of the dynamic routing component 275/675) may process (as described in detail herein above with respect to FIG. 5) to determine (934) skill identifiers with respective NLU hypotheses. The dynamic routing component 275/675 (and more particularly the skill proposer 510) may send (936), to the skill pre-response component 520, the skill identifiers and associated NLU hypotheses. The dynamic routing component 275/675 (and more particularly the skill proposer 510) may send such with associated metadata including the natural language input identifier.

Moreover, the dynamic routing component 275/675 (and more particularly the skill proposer 510) may send (938), to the skill ranker 530, the skill identifiers and associated NLU hypotheses. The dynamic routing component 275/675 (and more particularly the skill proposer 510) may send such with associated metadata including the natural language input identifier.

After sending, to the skill pre-response component 520, the skill identifiers with respective NLU hypotheses, the dynamic routing component 275/675 may determine the dynamic routing component 275/675 has sent all data types, to the skill pre-response component 520, that the dynamic routing component 275/675 was configured to send to the skill pre-response component 520. Based at least in part on this determination, the dynamic routing component 275/675 may send (940) a commit message to the skill pre-response component 520. In at least some embodiments, the commit message may include the natural language input identifier corresponding to the spoken natural language input. In at least some other embodiments, the commit message may be sent with associated metadata including the natural language input identifier.

Based at least in part on receiving the commit message from the dynamic routing component 275/675, the skill pre-response component 520 may process as described in detail herein above with respect to FIG. 5. In particular, the skill pre-response component 520 may send (942), to each skill corresponding to the received skill identifiers (collectively illustrated as skill system(s) 125 in FIGS. 9A-9D), a pre-response query, and may in turn receive (944) pre-response data from the queried skill. The skill pre-response component 520 may send (946), to the skill dynamic routing component 275/675, the skill identifiers associated with their respective pre-response data. The skill pre-response component 520 may send such with associated metadata including the natural language input identifier.

The dynamic routing component 275/675 may send (948), to the skill ranker 530, the skill identifiers associated with their respective pre-response data. The skill pre-response component 520 may send such with associated metadata including the natural language input identifier.

After sending, to the skill ranker 530, the skill identifiers associated with their respective pre-response data, the dynamic routing component 275/675 may determine the dynamic routing component 275/675 has sent all data types, to the skill ranker 530, that the dynamic routing component 275/675 was configured to send to the skill ranker 530. Based at least in part on this determination, the dynamic routing component 275/675 may send (950) a commit message to the skill ranker 530. In at least some embodiments, the commit message may include the natural language input identifier corresponding to the spoken natural language input. In at least some other embodiments, the commit message may be sent with associated metadata including the natural language input identifier.

Based at least in part on receiving the commit message from the dynamic routing component 275/675, the skill ranker 530 may process (as described in detail herein above with respect to FIG. 5) to determine (952) skill identifiers with respective NLU hypotheses and confidence scores. The skill ranker 530 may send (954), to the dynamic routing component 275/675, the skill identifiers with their respective NLU hypotheses and confidence scores. The skill ranker 530 may send such with associated metadata including the natural language input identifier.

Based at least in part on already receiving the commit message from the orchestrator component 230/LRO 628, upon receiving the data from the skill ranker 530, the dynamic routing component 275/675 (and more particularly the decider 540 of the dynamic routing component 275/675) may process (as described in detail herein above with respect to FIG. 5) to determine (956) execution plan data.

The dynamic routing component 275/675 may send (958) the execution plan data to the orchestrator component 230/LRO 628. The orchestrator component 230/LRO 628 may thereafter process (960) using the execution plan data. For example, the orchestrator component 230/LRO 628 may determine a skill identifier in the execution plan data, and may send an NLU hypothesis to the skill (associated with the skill identifier) so the skill can perform an action responsive to the spoken natural language input.

Generally, a processing component of a system may be allotted a certain amount of time to process. If the processing component is unable to process in the allotted amount of time, the system may (in at least some instances) cease processing of the command and may indicate to the user that the command could not be handled. According to the present disclosure, if parallel processing of processing components enables one processing component to process in less time than it is allotted, the saved time can be re-allocated to a second processing component's time allotment to enable the second processing component to process longer, while maintaining command input-to-system output timing constant.

Figure 10:
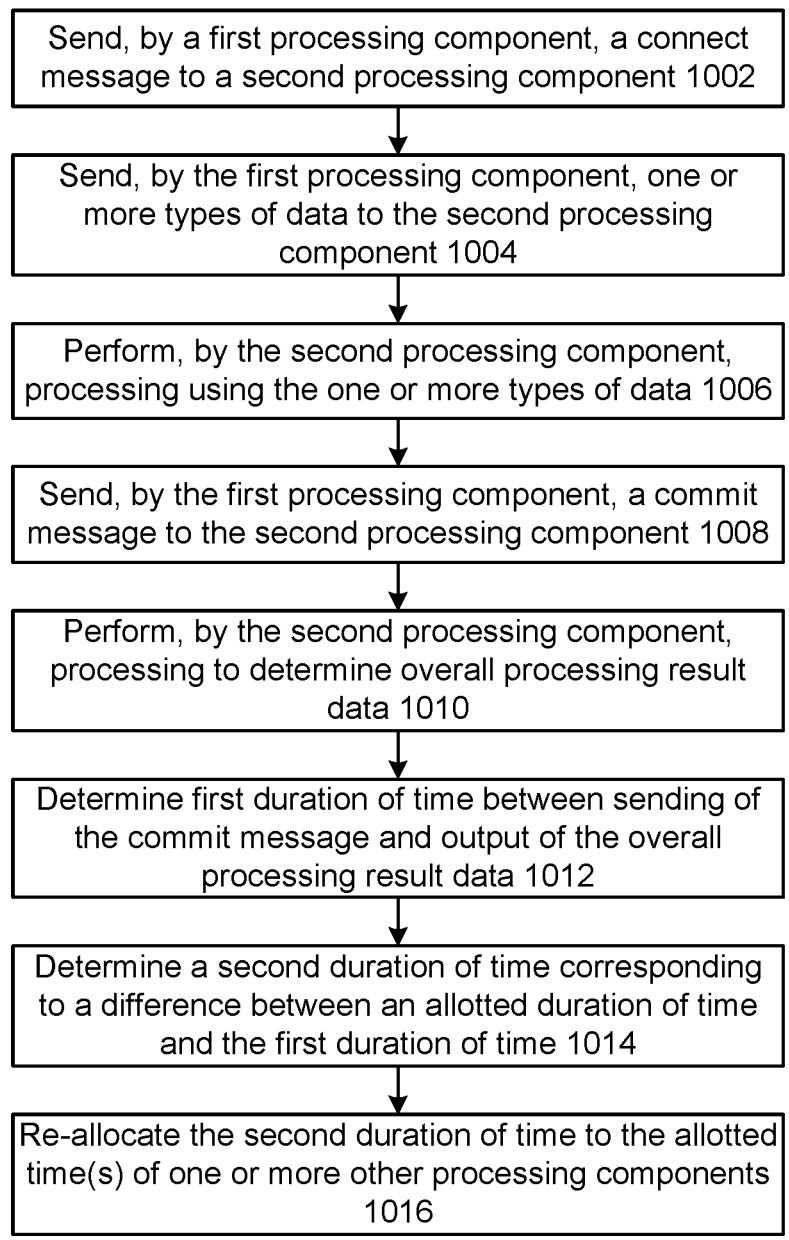
FIG. 10 is a process flow diagram illustrating how allotted processing time can be re-allocated among processing components, according to embodiments of the present disclosure.

With reference to FIG. 10, a first processing component may send (1002) a connect message to a second processing component. Thereafter, the first processing component may send (1004), to the second processing component, one or more types of data; and the second processing component may perform (1006) processing using the one or more types of data. At some point, the first processing component may send (1008) a commit message to the second processing component. Based at least in part on receiving the commit message, the second processing component may perform (1010) processing to determine overall processing result data.

Thereafter, the system 120/device 110 may determine (1012) a first duration of time starting with the sending of the commit message (by the first processing component) and ending with the output of the overall processing result data (by the second processing component). The system 120/device 110 may then determine (1014) a second duration of time corresponding to a different between an allotted duration of time (i.e., the amount of time allotted to the second processing component to process) and the first duration of time. The system 120/device 110 may then re-allocate (1016) the second duration of time to the allotted time(s) or one or more other processing components. For example, the system 120/device 110 may determine an allotted amount of processing time associated with a third processing component, and may increase this allotted amount of time by the second duration of time. For further example, the system 120/device 110 may determine a first allotted amount of processing time associated with a third processing component, determine a second allotted amount of processing time associated with a fourth processing component, increase the first allotted amount of time by a first portion of the second duration of time, and increase the second allotted amount of time by a second portion of the second duration of time. While it has been described that the system 120/device 110 may re-allocate the second duration of time among one or two different processing components, it will be appreciated that the system 120/device 110 may re-allocate the second duration of time among more than two different processing components without departing from the present disclosure.

In a system in which processing components implement unary RPCs, a first processing component makes a RPC call to a second processing component because the first processing component is certain the first processing component needs a response from the second processing component. In a system implementing streaming RPCs as taught herein, the first processing component 710 may send a connect message to the second processing component 720 and, thereafter, the first processing component 710 may determine the first processing component 710 cannot produce all of the data types needed to be input to the second processing component 720, and consequently may determine the second processing component 720 should cease processing. The foregoing scenario is conceptually illustrated in FIG. 11.

Figure 11:
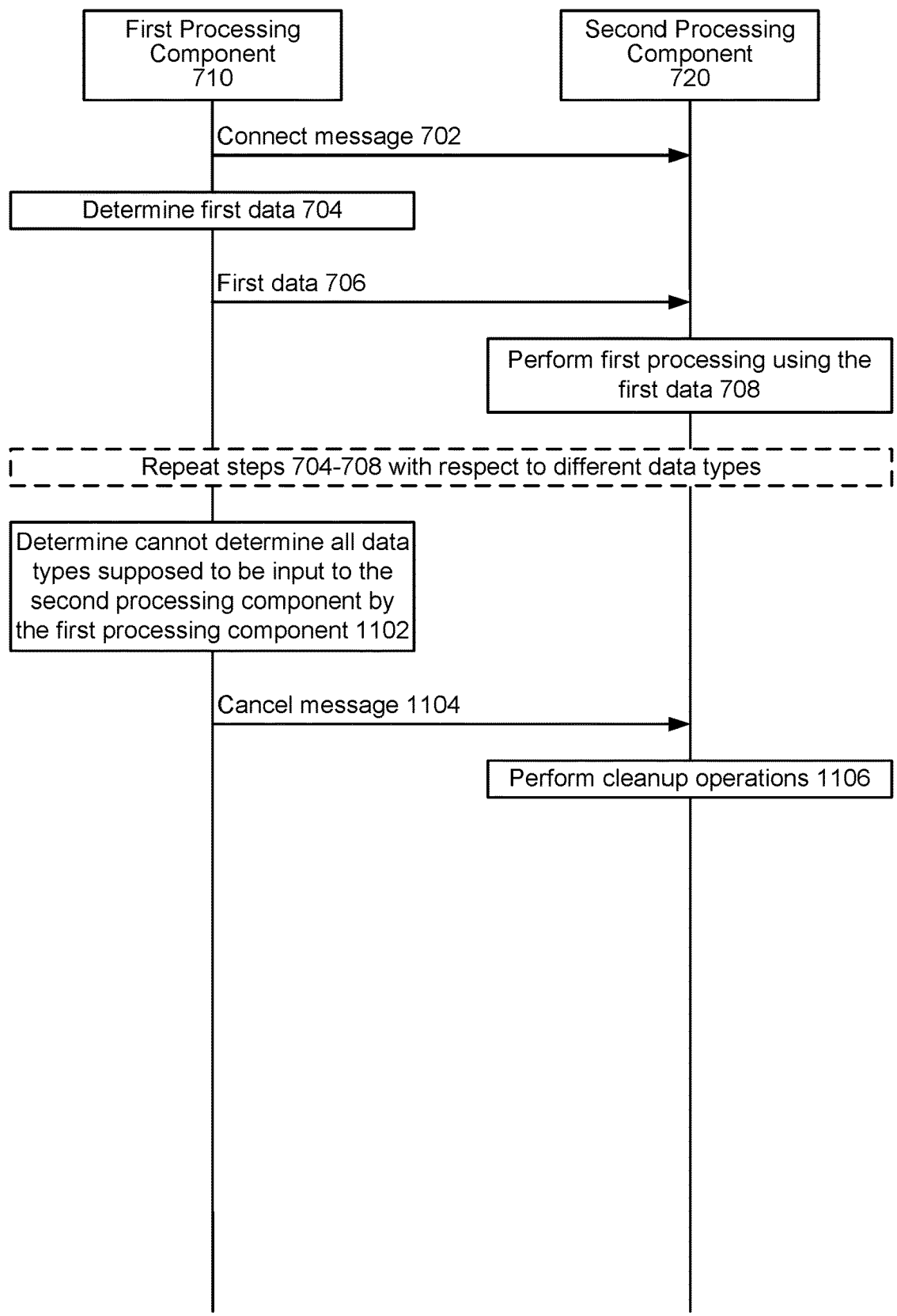
FIG. 11 is a signal flow diagram illustrating an example runtime scenario in which a first processing component may cause a second processing component to cease processing with respect to a streaming RPC, according to embodiments of the present disclosure.

As illustrated in FIG. 11, the first processing component 710 sends (702) the connect message to the second processing component 720. Sometime after sending (702) the connect message, the first processing component 710 determines (704) the first data (corresponding to the first data type, such as a user identifier, a device identifier, a device type, NLU output data, or some other type of data) that is to be processed by the second processing component 720. After determining (704) the first data, the first processing component 710 sends (706) the first data to the second processing component 720 (e.g., in a data packet including a command identifier associated with or included in the connect message). Upon receiving the first data, the second processing component 720 may perform (708) first processing using the first data. The first processing component 710 and the second processing component 720 may perform steps 704-708 with respect to different data types.

At some point, the first processing component 710 may determine (1102) the first processing component 710 cannot determine all data types the first processing component 710 is supposed to input to the second processing component 720. For example, the first processing component 710 may be configured to send three different data types to the second processing component 720, and the first processing component 710 may determine it is unable to determine at least one of the three data types.

Based at least in part on this determination, the first processing component 710 may send (1104) a cancel message to the second processing component 720. The cancel message may include (or be associated with metadata including) the command identifier that was included in (or associated with) the connect message.

Based at least in part on receiving the cancel message, the second processing component 720 may perform (1106) cleanup operations. Example cleanup operations include, but are not limited to, deleting from memory intermediate result data determined by the second processing component 720 and associated with the command identifier, and canceling scheduled but not yet performed (e.g., outstanding) processing associated with the command identifier.

In another example scenario, For example, multiple devices of the user 5 may capture a single command. In response, the first processing component 710 may send a first connect message, to the second processing component 720, including (or being associated with metadata including) a first command identifier; and the first processing component 710 may also send a second connect message, to the second processing component 720, including (or being associated with metadata including) a second command identifier. Thereafter, the first processing component 710 may determine the command, as captured by a first device of the user 5 should be processed rather than the command as captured by a second device of the user 5. The foregoing scenario is conceptually illustrated in FIG. 12.

Figure 12:
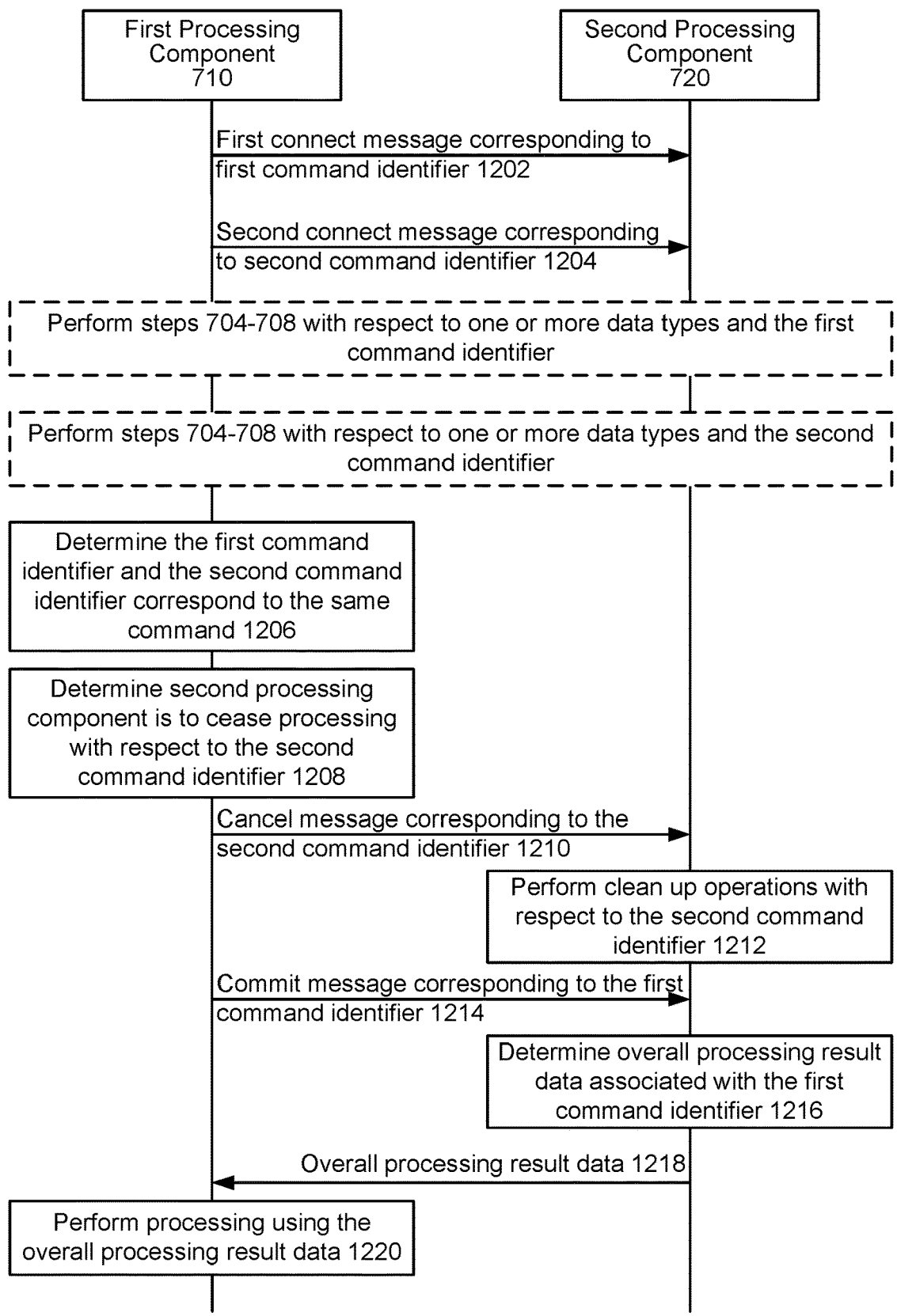
FIG. 12 is a signal flow diagram illustrating another example runtime scenario in which a first processing component may cause a second processing component to cease processing with respect to a streaming RPC, according to embodiments of the present disclosure.

As illustrated in FIG. 12, in response to a first device 110 of the user 5 capturing a command, the first processing component 710 may send (1202) a first connect message (corresponding to a first command identifier) to the second processing component 720. In at least some embodiments, the first connect message may include the first command identifier. In at least some other embodiments, the first connect message may be associated with metadata including the first command identifier.

Additionally, in response to a second device 110 of the user 5 capturing the same command as the first device 110, the first processing component 710 may send (1204) a second connect message (corresponding to a second command identifier) to the second processing component 720. In at least some embodiments, the second connect message may include the second command identifier. In at least some other embodiments, the second connect message may be associated with metadata including the second command identifier. The first connect message and the second connect message may be associated with different command identifiers because, at the connect message stage, no determination may have yet been made to determine the first and second devices captured the same command.

Sometime after the first connect message is sent, the first processing component 710 and the second processing component 720 may perform steps 704-708 (described in detail above with respect to FIG. 7) with respect to one or more data types and the first command identifier. Additionally or alternatively, sometime after the second connect message is sent, the first processing component 710 and the second processing component 720 may perform steps 704-708 with respect to one or more data types and the second command identifier.

At some point, the first processing component 710 may determine (1206) the first command identifier and the second command identifier correspond to the same command. For example, such determination may be made by determining the first command identifier and the second command identifier correspond to the same (or substantially similar) command capture timestamps, determining the first device (associated with the first command identifier) and the second device (associated with the second command identifier) are represented in a same profile in the profile storage 270/670, and/or determining that the first command and the second command were provided by the same user (based on performing user recognition by user recognition component 295). In at least some embodiments, the first processing component 710 may make the foregoing determinations. In at least some other embodiments, some other component of the system 100 may make the foregoing determinations, and may send data representing a result of the determinations to the first processing component 710.

Based at least in part on determining the first command identifier and the second command identifier correspond to the same command, the first processing component 710 may determine (1208) the second processing component 720 is to cease processing with respect to the second command identifier. Based at least in part on this determination, the first processing component 710 may send (1210), to the second processing component 720, a cancel message corresponding to the second command identifier. In at least some embodiments, the cancel message may include the second command identifier. In at least some other embodiments, the cancel message may be associated with metadata including the second command identifier.

Based at least in part on receiving the cancel message, the second processing component 720 may perform (1212) cleanup operations with respect to the second command identifier. Example cleanup operations include, but are not limited to, deleting from memory intermediate result data determined by the second processing component 720 and associated with the second command identifier, and canceling scheduled but not yet performed (e.g., outstanding) processing associated with the second command identifier.

At some point after performing steps 704-708 with respect to two or more data types and the first command identifier, the first processing component 710 may send (1214), to the second processing component 720, a commit message corresponding to the first command identifier. In at least some embodiments, the command message may include the first command identifier. In at least some other embodiments, the commit message may be associated with metadata including the first command identifier.

In response to receiving the commit message, the second processing component 720 may determine (1216) overall processing result data associated with the first command identifier. For example, in response to receiving the commit message, the second processing component 720 may fetch the intermediate result data (associated with the first command identifier) from memory and may determine the overall processing result data using the fetched intermediate result data. The second processing component 720 thereafter sends (1218) the overall processing result data to the first processing component 710, which then performs (1220) processing using the overall processing result data.

Figure 13:
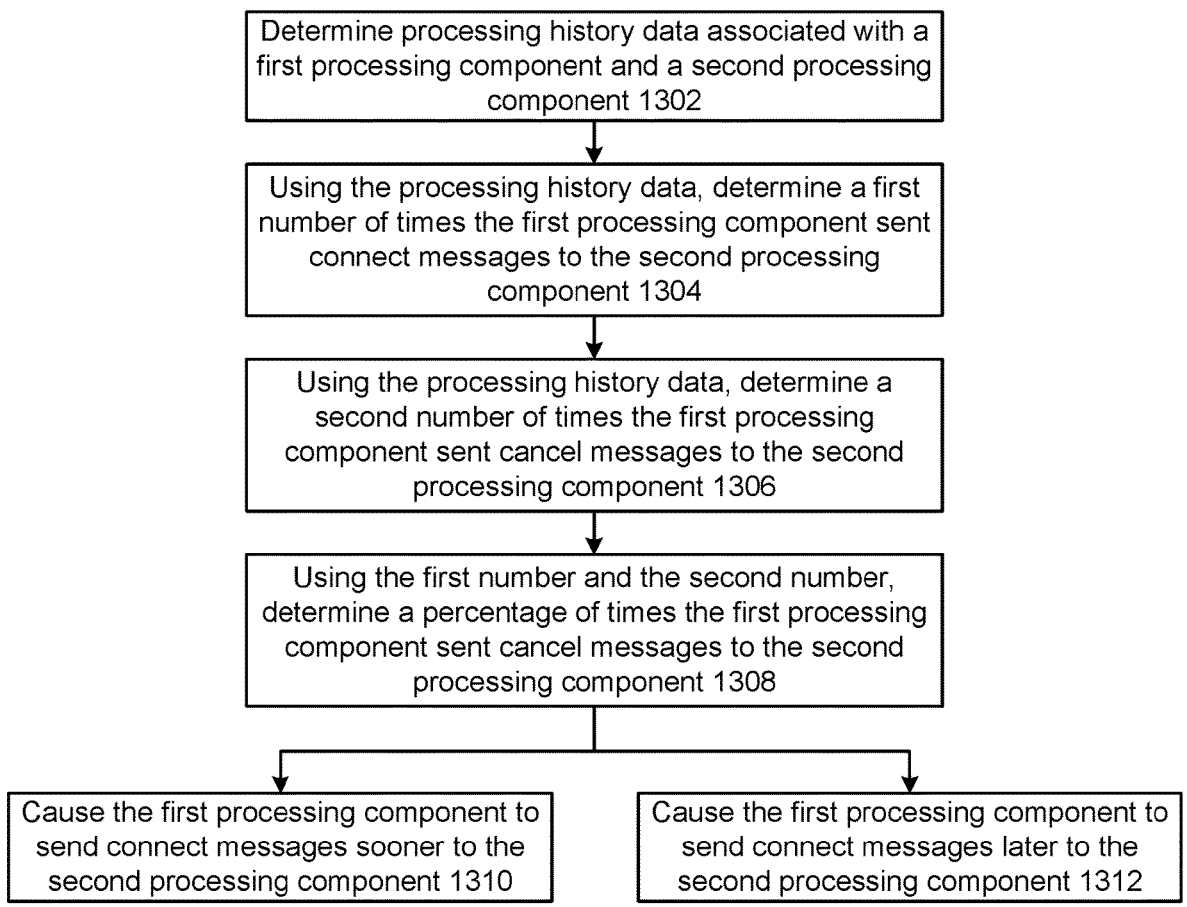
FIG. 13 is a process flow diagram illustrating how a system may dynamically configure when a first processing component is to send a connect message to a second processing component, according to embodiments of the present disclosure.

At least some systems may be configured to target a particular cancelation rate, or cancelation rate range. For example, a system may be configured such that a first processing component is not to send cancel messages to a second processing component more than 10% of the times the first processing component sends connect messages to the second processing component. As illustrated in FIG. 13, the system 120/device 110 may determine (1302) processing history data associated with a first processing component and a second processing component. The processing history data may represent (at least) previous instances when the first processing component sent connect messages to the second processing component, as well as represent previous instances when the first processing component sent cancel messages to the second processing component.

The system 120/device 110 may determine (1304), using the processing history data, a first number of times the first processing component sent connect messages to the second processing component. The system 120/device 110 may also determine (1306), using the processing history data, a second number of times the first processing component sent cancel messages to the second processing component. The system 120/device 110 may, using the first number and the second number, determine (1308) a percentage of times the first processing component sent cancel messages to the second processing component.

Based on the percentage, the system 120/device 110 may re-configure the first processing component to increase the percentage. To increase the percentage, the system 120/device 110 may cause (1310) the first processing component to send connect messages sooner to the second processing component. For example, the system 120/device 110 may determine the percentage satisfies a condition (e.g., is less than a threshold percentage, is equal to or less than a threshold percentage, etc.) and, based thereon, may determine the first processing component is to send connect messages to the second processing component sooner. As an example, if the first processing component was configured to send connect messages to the second processing component after the first processing component determined one data type (to be sent to the second processing component), the system 120/device 110 may re-configure the first processing component to send connect messages to the second processing component as soon as possible (e.g., as soon as the first processing component determines it is to send a connect message to the second processing component, which may be prior to the first processing component determining a single data type to be sent to the second processing component). As a further example, if the first processing component was configured to send connect messages to the second processing component after the first processing component determined two data types to be sent to the second processing component, the system 120/device 110 may re-configure the first processing component to send connect messages to the second processing component after the first processing component determines one data type, or prior to the first processing component determining a single data type to be sent to the second processing component. While reconfiguring the first processing component as such may result in the percentage of cancel messages increasing between the first processing component and the second processing component, such increase may be outweighed by the benefit by the increased potential of parallel processing enabled by sending of the connect message sooner.

Alternatively, based on the percentage, the system 120/device 110 may re-configure the first processing component to decrease the percentage. To decrease the percentage, the system 120/device 110 may cause (1312) the first processing component to send connect messages later to the second processing component. For example, the system 120/device 110 may determine the percentage satisfies a condition (e.g., is greater than a threshold percentage, is equal to or greater than a threshold percentage, etc.) and, based thereon, may determine the first processing component is to send connect messages to the second processing component later (e.g., after the first processing component has determined some threshold amount of data intended to be sent to the second processing component, such as a one data type threshold, a two data type threshold, etc.). In at least some embodiments, the threshold percentage (discussed above with respect to process 1310) may be the same threshold percentage discussed with respect to process 1312. In at least some other embodiments, the threshold percentage (discussed with respect to process 1310) may be lower than the threshold percentage discussed with respect to process 1312.

As an example, if the first processing component is configured to send connect messages to the second processing component as soon as the first processing component determines it is to send a connect message to the second processing component (e.g., prior to the first processing component determining a single data type to be sent to the second processing component), the system 120/device 110 may re-configure the first processing component to send connect messages to the second processing component after the first processing component determines one data type to be sent to the second processing component. As a further example, if the first processing component is configured to send connect messages to the second processing component after the first processing component determined one data type to be sent to the second processing component, the system 120/device 110 may re-configure the first processing component to send connect messages to the second processing component after the first processing component determines two data types to be sent to the second processing component.

In at least some embodiments, processes 1302-1312 may be performed by the first processing component. In at least some other embodiments, processes 1302-1312 may be performed by a third processing component (which may or may not be a machine learned component) of the system 120/device 110.

In at least some embodiments, the system 120/device 110 may include a third processing component conceptually positioned so that it executes/processes between the first processing component and the second processing component. The first processing component may be configured to send data intended for the second processing component (e.g., connect messages, data types, commit messages, cancel messages, etc.) to the third processing component, and the third processing component may be configured to send the data (received from the first processing component) to the second processing component. In such system configuration, the first processing component may send data (intended for the second processing component) to the third processing component as soon as the data is determined by the first processing component. However, the third processing component may not immediately send the data to the second processing component. For example, the first processing component may send the third processing component a connect message intended for the second processing component, and the system 120/device 110 may have determined that the first processing component is not to connect to the second processing component until the first processing component has determined a first data type intended for the second processing component. In such a scenario, the third processing component may buffer the connect message until the third processing component receives a first data type (intended for the second processing component) from the first processing component. Upon receiving the first data type, the third processing component may send both the connect message and the first data type to the second processing component. One skilled in the art will appreciate that the foregoing "buffering" processing of the third processing component may be adapted to be performed when the system 120/device 110 determines the first processing component is not to connect to the second processing component until after the first processing component has determined two or more data types intended for the second processing component. It will also be appreciated that the third processing component may be implemented when the system 120/device 110 determines the first processing component may connect to the second processing component as soon as possible. In such a scenario, the third processing component may send the connect message to the second processing component as soon as the third processing component receives the connect message from the first processing component.

Figure 14:
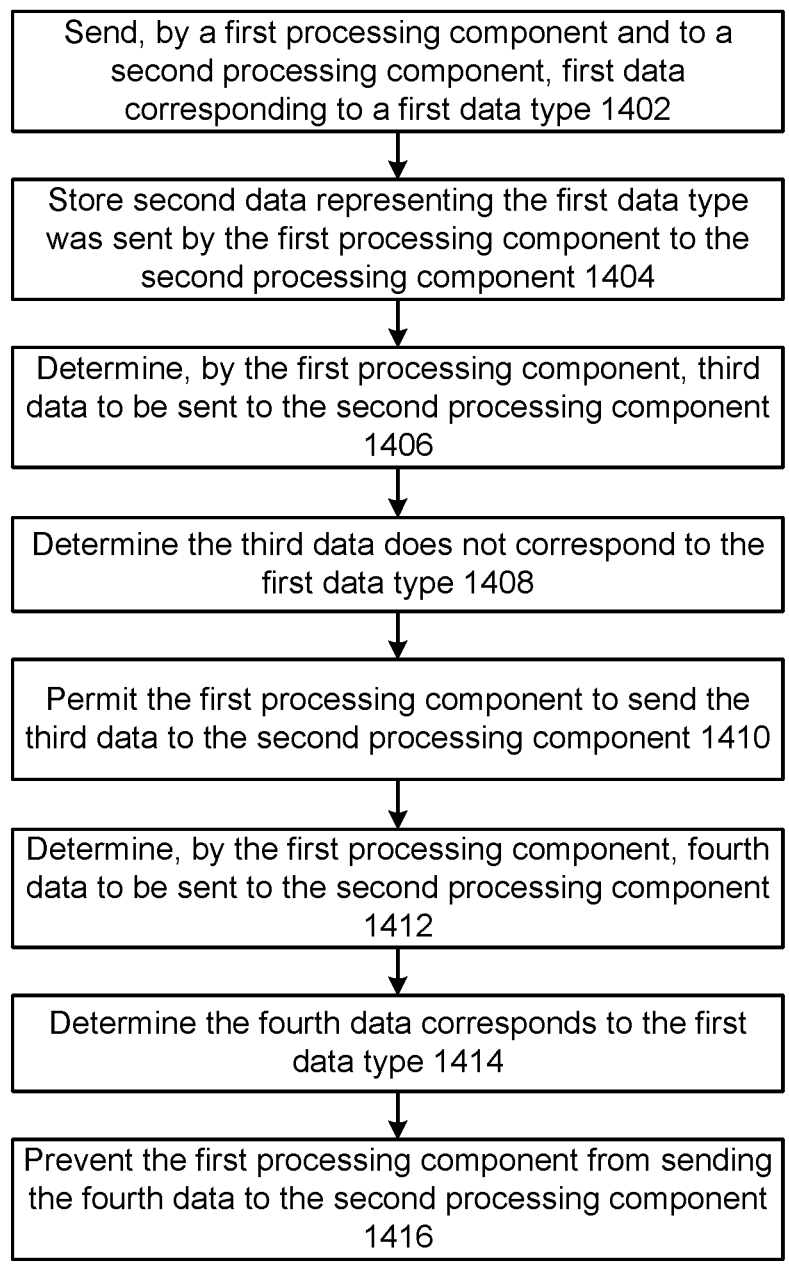
FIG. 14 is a process flow diagram illustrating how a system may perform input stream validation, according to embodiments of the present disclosure.

It may be beneficial for a system, implementing a streaming RPC mechanism as taught herein, to perform input stream validation since there may be nothing in the streaming RPC mechanism that prevents a first processing component from sending the same data type to a second processing component with respect to processing of the same command. Referring to FIG. 14, the first processing component may send (1402), to the second processing component, first data corresponding to a first data type. Prior to, during, or after sending of the first data, the system 120/device 110 may store (1404) second data representing the first data type was sent by the first processing component to the second processing component.

After the second data is stored, the first processing component may determine (1406) third data to be sent to the second processing component. The system 120/device 110 may determine (1408) the third data does not correspond to the first data type. Based at least in part on this determination, the system 120/device 110 may permit (1410) the first processing component to send the third data to the second processing component.

Moreover, sometime after the second data is stored, the first processing component may determine (1412) fourth data is to be sent to the second processing component. The system 120/device 110 may determine (1414) the fourth data corresponds to the first data type. Based at least in part on this determination, the system 120/device 110 may prevent (1416) the first processing component from sending the fourth data to the second processing component.

In at least some embodiments, the first processing component may perform processes 1404, 1414, and 1416. In such embodiments, upon the first processing component determining the fourth data corresponds to the first data type, the first processing component may delete the fourth data.

An exception to step 1416 may be implemented when the fourth data corresponds to a higher confidence score than the first data. For example, the first data may be first ASR output data determined after processing a first portion of a user input. The first ASR output data may be associated with a first ASR confidence score. After sending the first ASR output data to the second processing component, the first processing component may determine second ASR output data after processing a further portion of the user input. The second ASR output data may be associated with a second ASR confidence score that is greater than the first ASR confidence score of the first ASR output data. In such a scenario, even though the first ASR output data and the second ASR output data correspond to a same data type (i.e., ASR output data), the first processing component may nonetheless send the second ASR output data to the second processing component based on the second confidence score being greater than the first confidence score. In at least some embodiments, as a result of the second ASR confidence score being higher than the first ASR confidence score, the first processing component 710 may send a cancel message to the second processing component 720 with respect to a HTTP connection associated with processing of the first ASR output data, and may send a connect message to the second processing component 720 to establish a new HTTP connection for sending of the second ASR output data to the second processing component 720. While the foregoing describes processing performed with respect to ASR output data, it will be appreciated that the foregoing may be applied with respect to any data type in which the data type corresponds to first data, associated with a first confidence score, and subsequently determined second data (determined with respect to processing of the same command) associated with a second, higher confidence score.

In at least some embodiments, a third processing component (which may or may not be a machine learned component) may be conceptually positioned between the first processing component and the second processing component. In such embodiments, the first processing component may send the third data to the third processing component, the third processing component may determine the third data does not correspond to the first data type (already sent to the second processing component), and the third processing component may send the third data to the second processing component. Moreover, in such embodiments, the first processing component may send the fourth data to the third processing component, the third processing component may determine the fourth data corresponds to the first data type (already sent to the second processing component), and the third processing component may delete the fourth data without sending the fourth data to the second processing component.

There may be situations where a first processing component sends a connect message to a second processing component, and therefore the first processing component becomes disconnected from a second processing component prior to the first processing component sending a cancel message to the second processing component, or prior to the first processing component receiving overall processing result data from the second processing component. In such situations, it may be beneficial for the first processing component to maintain a record of data sent to the second processing component prior to termination of the connection, for purposes of resending in a RPC retry.

Figure 15:
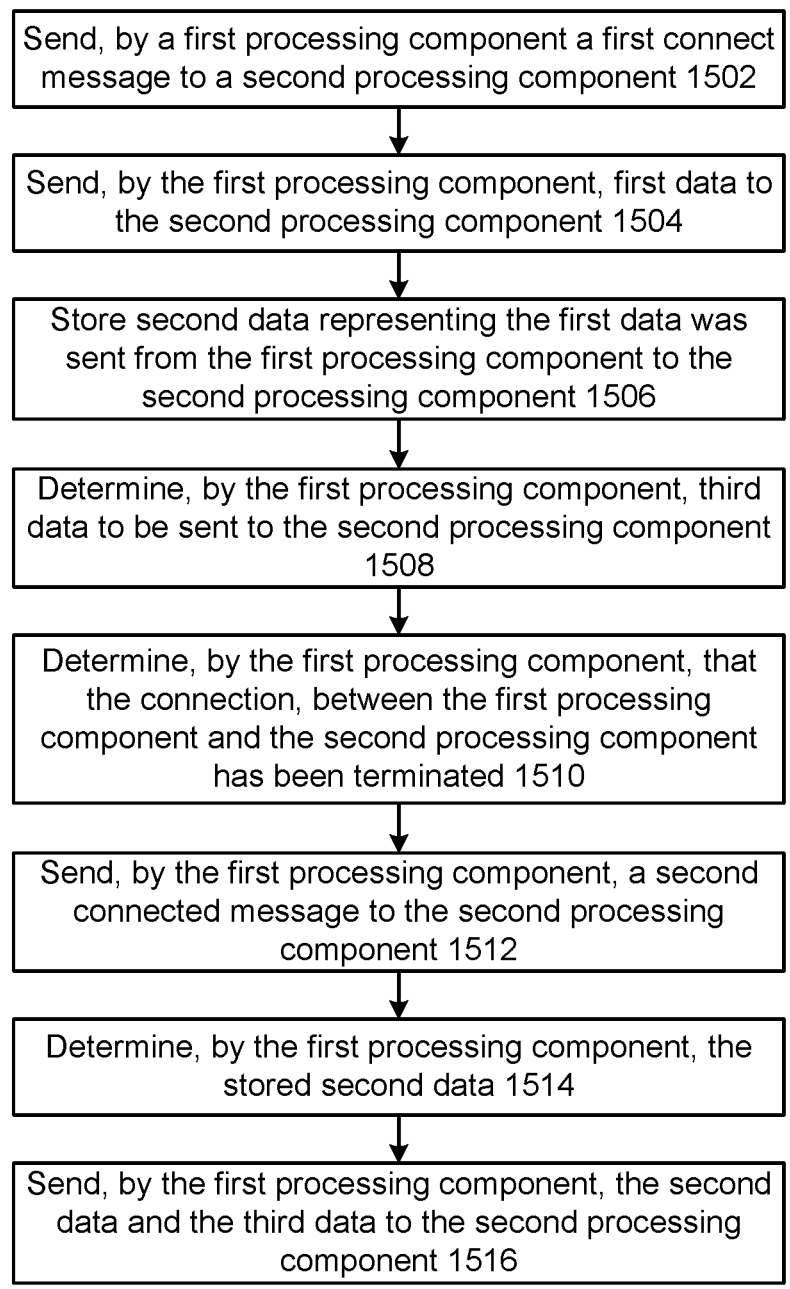
FIG. 15 is a process flow diagram illustrating how a system, implementing a streaming RPC mechanism, may perform a call retry, according to embodiments of the present disclosure.

Referring to FIG. 15, the first processing component may send (1502) a connect message to the second processing component. Thereafter, the first processing component may send (1504) first data to the second processing component. Prior to, during, or after sending of the first data, the system 120/device 110 (and in some instances, the first processing component) may store (1506) second data representing the first data was sent to the first processing component to the second processing component. Thereafter, the first processing component may determine (1508) third data to be sent to the second processing component.

Sometime between sending of the first data and determination of the third data, the connection between the first processing component and the second processing component may be terminated. The first processing component may specifically determine (1510) the connection (e.g., a HTTP connection) has been terminated. In at least some embodiments, the first processing component may determine such by sending the third data to the second processing component, and receiving an error message from the second processing component in return. The second processing component may send the error message, to the first processing component, based on termination of the connection causing the first processing component to be unauthenticated with the second processing component.

Based at least in part on receiving the error message, the first processing component may send (1512) a second connect message to the second processing component. This second connect message may include (or be associated with metadata including) a same command identifier that was included in the originally sent connect message (or included in metadata associated with the originally sent connect message).

Moreover, based at least in part on receiving the error message, the first processing component may determine (1514) the stored second data. For example, the first processing component may determine the stored second data based at least in part on the stored second data being associated with a same command identifier as the originally sent connect message.

After determining the stored second data, the first processing component may send (1516), the second data and the third data to the second processing component. The first processing component may send the second data and the third data contemporaneously with or after sending the second connect message to the second processing component.

While it has been described with respect to FIG. 15 that the first processing component may determine a single instance of data that was already sent to the second processing component (i.e., the aforementioned second data), the present disclosure is not limited thereto. In at least some instances, the first processing component may determine two or more instances of data that were already sent to the second processing component. In such instances, contemporaneously with or after sending the second connect message, the first processing component may send, to the second processing component, the two or more instances of data (previously sent to the second processing component) as well as the aforementioned third data that was previously sent and resulted in the error message.

All of a system's processing components may be configured to process using a streaming RPC mechanism as described herein. Alternatively, only a portion of a system's processing components may be configured to process using a streaming RPC mechanism as disclosed herein. For example, a system may include a first portion of processing components configured to process using a streaming RPC mechanism as disclosed herein, and a second portion of processing components configured to process using a unary RPC mechanism as known in the art.

Figure 16:
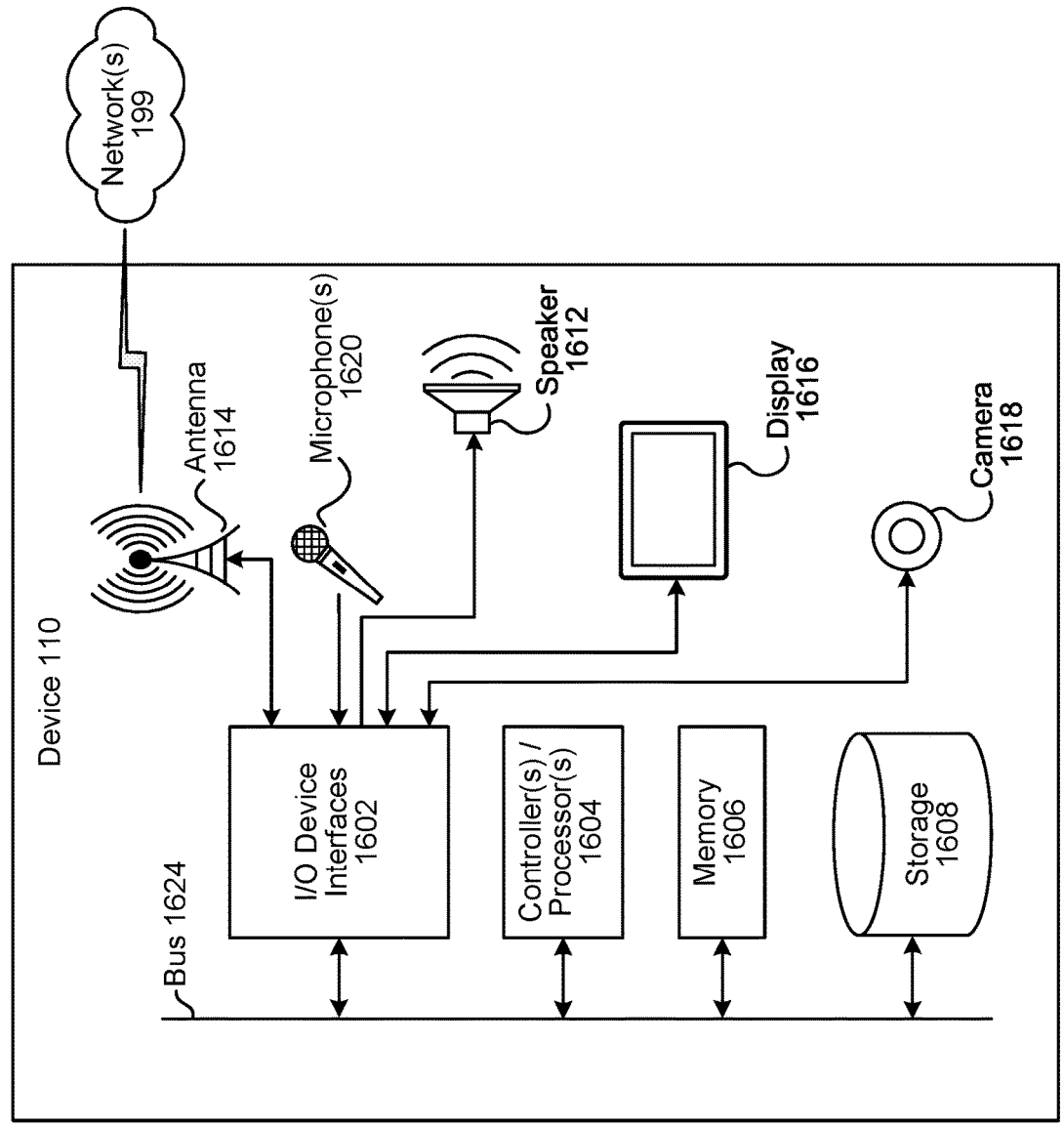
FIG. 16 is a block diagram conceptually illustrating example components of a device, according to embodiments of the present disclosure.
Figure 17:
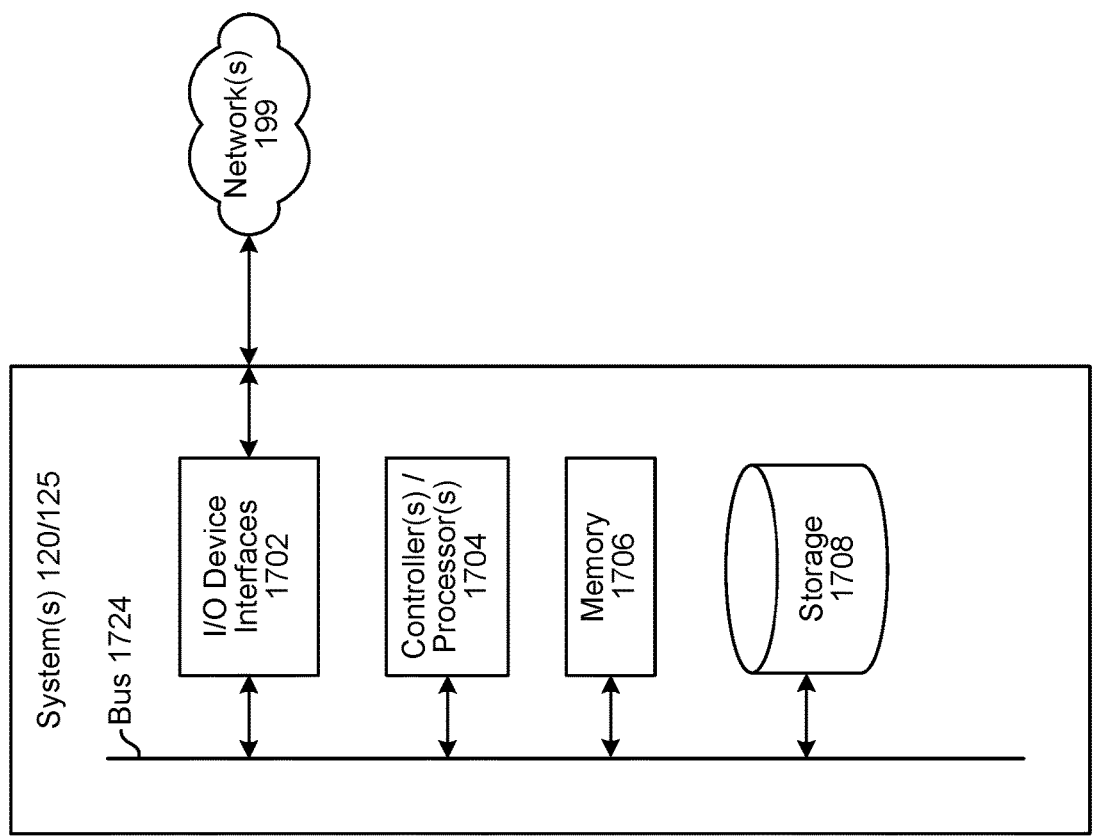
FIG. 17 is a block diagram conceptually illustrating example components of a system, according to embodiments of the present disclosure.

FIG. 16 is a block diagram conceptually illustrating example components of a device 110 according to the present disclosure. FIG. 17 is a block diagram conceptually illustrating example components of a system, such as the system 120 or a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill systems 125, etc. In operation, each of these systems may include computer-readable and computer-executable instructions that reside on the respective device (120/125), as will be discussed further below.

Each of these devices (110/120/125) may include one or more controllers/processors (1604/1704), which may each include a central processing unit (CPU) for processing data and computer-readable instructions, and a memory (1606/1706) for storing data and instructions of the respective device. The memories (1606/1706) may individually include volatile random access memory (RAM), non-volatile read only memory (ROM), non-volatile magnetoresistive memory (MRAM), and/or other types of memory. Each device (110/120/125) may also include a data storage component (1608/1708) for storing data and controller/processor-executable instructions. Each data storage component (1608/1708) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1602/1702).

Computer instructions for operating each device (110/120/125) and its various components may be executed by the respective device's controller(s)/processor(s) (1604/1704), using the memory (1606/1706) as temporary "working" storage at runtime. A device's computer instructions may be stored in a non-transitory manner in non-volatile memory (1606/1706), storage (1608/1708), or an external device(s). Alternatively, some or all of the executable instructions may be embedded in hardware or firmware on the respective device in addition to or instead of software.

Each device (110/120/125) includes input/output device interfaces (1602/1702). A variety of components may be connected through the input/output device interfaces (1602/1702), as will be discussed further below. Additionally, each device (110/120/125) may include an address/data bus (1624/1724) for conveying data among components of the respective device. Each component within a device (110/120/125) may also be directly connected to other components in addition to (or instead of) being connected to other components across the bus (1624/1724).

Referring to FIG. 16, the device 110 may include input/output device interfaces 1602 that connect to a variety of components such as an audio output component such as a speaker 1612, a wired headset or a wireless headset (not illustrated), or other component capable of outputting audio. The device 110 may also include an audio capture component. The audio capture component may be, for example, a microphone 1620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1616 for displaying content. The device 110 may further include a camera 1618.

Via antenna(s) 1614, the input/output device interfaces 1602 may connect to one or more networks 199 via a wireless local area network (WLAN) (such as WIFI) radio, short-range wireless technologies (such as BLUETOOTH), and/or wireless network radio, such as a radio capable of communication with a wireless communication network such as a Long Term Evolution (LTE) network, WIMAX network, 3G network, 4G network, 5G network, etc. A wired connection such as Ethernet may also be supported. Through the network(s) 199, the system may be distributed across a networked environment. The I/O device interface (1602/1702) may also include communication components that allow data to be exchanged between devices such as different physical servers in a collection of servers or other components.

The components of the device 110, the system 120, and/or a skill system 125 may include their own dedicated processors, memory, and/or storage. Alternatively, one or more of the components of the device 110, the system 120, and/or a skill system 125 may utilize the I/O interfaces (1602/1702), processor(s) (1604/1704), memory (1606/1706), and/or storage (1608/1708) of the device(s) 110, system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 125, as described herein, are illustrative, and may be located as a stand-alone device or may be included, in whole or in part, as a component of a larger device or system.

Figure 18:
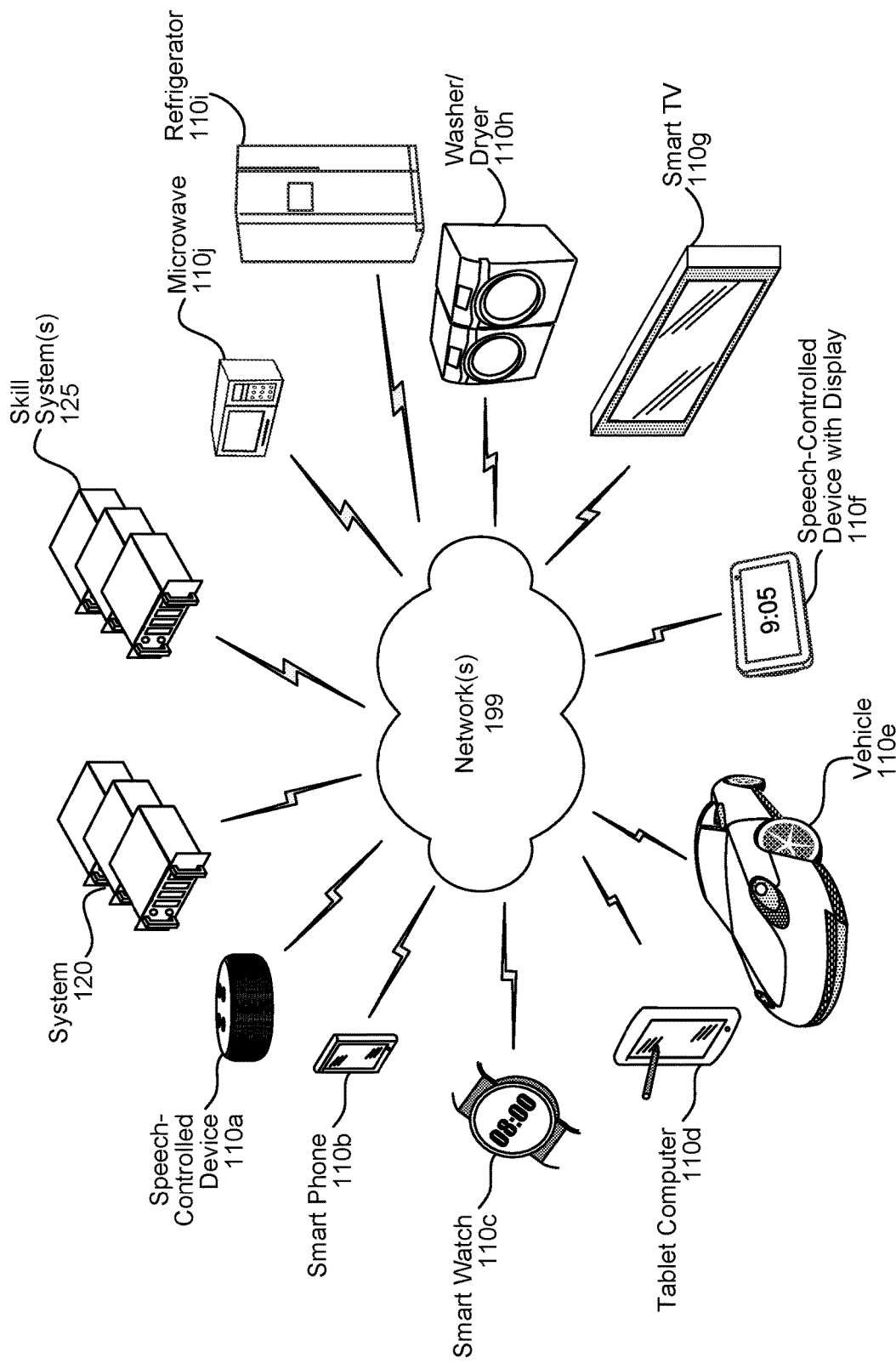
FIG. 18 illustrates an example of a computer network for use with the overall system, according to embodiments of the present disclosure.

As illustrated in FIG. 18, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a first device, first audio data representing a spoken natural language input;
determining a user identifier associated with the first audio data;
sending, by an orchestrator component and to a first processing component, first data representing the orchestrator component will be sending a first plurality of data types to the first processing component to enable the first processing component to select, from among a plurality of processing components, a processing component configured to determine a response to the spoken natural language input;
after sending the first data, sending, by the orchestrator component, the user identifier to the first processing component;
performing automatic speech recognition (ASR) processing on the first audio data to determine ASR output data;
performing natural language understanding (NLU) processing on the ASR output data to determine NLU output data;
after sending the first data and the user identifier, sending, by the orchestrator component, the NLU output data to the first processing component;
after sending the NLU output data and the user identifier, sending, by the orchestrator component and to the first processing component, second data representing the first processing component has received all of the first plurality of data types to be sent to the first processing component by the orchestrator component;
after sending the second data, receiving, from the first processing component, third data representing a second processing component is to determine the response to the spoken natural language input; and
causing the second processing component to determine the response to the spoken natural language input.

2. The computer-implemented method of claim 1, further comprising:
after sending the first data, determining directed acyclic graph (DAG) data representing processing to be performed by the first processing component, wherein determining the DAG data comprises:
determining a first node representing first processing to be performed with respect to the user identifier, and
determining a second node representing second processing to be performed with respect to the NLU output data; and
at least partially in parallel to performing the ASR processing, performing the first processing by the first processing component.

3. The computer-implemented method of claim 1, further comprising:
receiving, from a second device, second audio data representing the spoken natural language input;
sending, by the orchestrator component and to the first processing component, fourth data representing the orchestrator component is to send a second plurality of data types to the first processing component to enable the first processing component to perform processing with respect to the spoken natural language input;
after sending the fourth data, determining the spoken natural language input is to be processed using the first audio data instead of the second audio data; and
after determining the spoken natural language input is to be processed using the first audio data instead of the second audio data, sending, to the first processing component, fifth data representing the first processing component is to cease processing associated with the spoken natural language input as represented in the second audio data.

4. The computer-implemented method of claim 1, further comprising:
determining processing history data representing previous instances when the orchestrator component indicated the orchestrator component was to send the first plurality of data types to the first processing component;
determining a portion, of the previous instances, when the orchestrator component instructed the first processing component to cease processing after the orchestrator component indicated the orchestrator component was to send the first plurality of data types to the first processing component; and
based at least in part on the portion of the previous instances, determining at least two data types, of the first plurality of data types, prior to sending the first data to the first processing component.

5. A computer-implemented method comprising:
receiving first data representing a user command;
determining a first processing component is to send a plurality of data types to a second processing component;
sending, by the first processing component and to the second processing component, second data representing the first processing component will be sending the plurality of data types to the second processing component to enable the second processing component to perform processing with respect to the user command;
determining third data corresponding to the user command, the third data corresponding to a first data type of the plurality of data types;
after sending the second data, sending, by the first processing component, the third data to the second processing component;
after sending the third data, determining fourth data corresponding to the user command, the fourth data corresponding to a second data type of the plurality of data types;
after sending the second data and the third data, sending, by the first processing component, the fourth data to the second processing component, wherein sending the fourth data after sending the third data enables the second processing component to process with respect to the third data at least partially in parallel to the fourth data being determined;
after sending the third data and the fourth data, sending, by the first processing component and to the second processing component, fifth data representing the second processing component has received all of the plurality of data types to be sent to the second processing component by the first processing component;
after sending the fifth data, receiving, from the second processing component, sixth data determined from processing of at least the third data and the fourth data by the second processing component; and
based at least in part on the sixth data, determining output data responsive to the user command.

6. The computer-implemented method of claim 5, further comprising:
determining directed acyclic graph (DAG) data corresponding to processing to be performed by the second processing component, wherein determining the DAG data comprises determining a first node of the DAG data to represent first processing to be performed with respect to the first data type.

7. The computer-implemented method of claim 5, wherein receiving the first data comprises receiving audio data representing a spoken natural language input, and wherein the computer-implemented method further comprises:
   performing automatic speech recognition (ASR) processing on the audio data to determine ASR output data, wherein the second processing component processes at least the third data at least partially in parallel to the ASR processing being performed.

8. The computer-implemented method of claim 5, wherein the first data is received from a first device, and wherein the computer-implemented method further comprises:
   receiving, from a second device, seventh data representing the user command;
   prior to sending the third data, sending, by the first processing component and to the second processing component, eighth data representing the first processing component is to send the plurality of data types to the second processing component with respect to the user command as represented in the seventh data;
   after sending the third data, determining the user command is to be processed based at least in part on the first data instead of the seventh data; and
   after determining the user command is to be processed based at least in part on the first data instead of the seventh data, sending, to the second processing component, ninth data representing the second processing component is to cease processing associated with the user command as represented in the seventh data.

9. The computer-implemented method of claim 5, further comprising:
   determining processing history data representing previous instances when the first processing component indicated the first processing component was to send the plurality of data types to the second processing component;
   determining a portion, of the previous instances, when the first processing component caused the second processing component to cease processing after the first processing component indicated the first processing component was to send the plurality of data types to the second processing component; and
   based at least in part on the portion of the previous instances, determining at least the third data prior to sending the second data to the second processing component.

10. The computer-implemented method of claim 5, further comprising:
    after sending the third data, representing, in storage, that the first data type was sent to the second processing component;
    after representing the first data type in the storage, determining seventh data corresponding to the first data type;
    after determining the seventh data, determining, using the storage, that the first data type was sent to the second processing component; and
    based at least in part on determining the first data type was sent to the second processing component, deleting the seventh data without sending the seventh data to the second processing component.

11. The computer-implemented method of claim 5, further comprising:

representing, in storage, that the first data type was sent to the second processing component;
determining seventh data corresponding to the user command, the seventh data corresponding to a third data type;
after sending the second data, sending the seventh data to the second processing component;
representing, in the storage, that the third data type was sent to the second processing component;
after sending the seventh data, determining the first processing component is unable to send a further data type to the second processing component;
after determining the first processing component is unable to send the further data type, sending, by the first processing component and to the second processing component, eighth data representing the first processing component is to send the plurality of data types to the second processing component; and
after sending the eighth data and based at least in part on the first data type and the third data type being represented in the storage, sending, by the first processing component and to the second processing component, the third data and the seventh data.

12. The computer-implemented method of claim 5, further comprising:
    upon the second processing component receiving the third data and prior to the first processing component sending the fourth data, processing the third data by the second processing component.

13. A computing system, comprising:
    at least one processor; and
    at least one memory comprising instructions that, when executed by the at least one processor, cause the computing system to:
      receive first data representing a user command;
      determine a first processing component is to send a plurality of data types to a second processing component;
      send, by the first processing component and to the second processing component, second data representing the first processing component will be sending the plurality of data types to the second processing component to enable the second processing component to perform processing with respect to the user command;
      determine third data corresponding to the user command, the third data corresponding to a first data type of the plurality of data types;
      after sending the second data, send, by the first processing component, the third data to the second processing component;
      after sending the third data, determine fourth data corresponding to the user command, the fourth data corresponding to a second data type of the plurality of data types;
      after sending the second data and the third data, send, by the first processing component, the fourth data to the second processing component, wherein sending the fourth data after sending the third data enables the second processing component to process with respect to the third data at least partially in parallel to the fourth data being determined;
      after sending the third data and the fourth data, send, by the first processing component and to the second processing component, fifth data representing the second processing component has received all of the plurality of data types to be sent to the second processing component by the first processing component;

after sending the fifth data, receive, from the second processing component, sixth data determined from processing of at least the third data and the fourth data by the second processing component; and based at least in part on the sixth data, determine output data responsive to the user command.

14. The computing system of claim 13, wherein the at least one memory further comprises instructions that, when executed by the at least one processor, further cause the computing system to:

determine directed acyclic graph (DAG) data corresponding to processing to be performed by the second processing component, wherein determining the DAG data comprises determining a first node of the DAG data to represent first processing to be performed with respect to the first data type.

15. The computing system of claim 13, wherein the instructions to receive the first data further comprise instructions to receive audio data representing a spoken natural language input, and wherein the at least one memory further comprises instructions that, when executed by the at least one processor, further cause the computing system to:

perform automatic speech recognition (ASR) processing on the audio data to determine ASR output data, wherein the second processing component processes at least the third data at least partially in parallel to the ASR processing being performed.

16. The computing system of claim 13, wherein the first data is received from a first device, and wherein the at least one memory further comprises instructions that, when executed by the at least one processor, further cause the computing system to:

receive, from a second device, seventh data representing the user command;

prior to sending the third data, send, by the first processing component and to the second processing component, eighth data representing the first processing component is to send the plurality of data types to the second processing component with respect to the user command as represented in the seventh data;

after sending the third data, determine the user command is to be processed based at least in part on the first data instead of the seventh data; and after determining the user command is to be processed based at least in part on the first data instead of the seventh data, send, to the second processing component, ninth data representing the second processing component is to cease processing associated with the user command as represented in the seventh data.

17. The computing system of claim 13, wherein the at least one memory further comprises instructions that, when executed by the at least one processor, further cause the computing system to:

determine processing history data representing previous instances when the first processing component indicated the first processing component was to send the plurality of data types to the second processing component;

determine a portion, of the previous instances, when the first processing component caused the second processing component to cease processing after the first processing component indicated the first processing component was to send the plurality of data types to the second processing component; and based at least in part on the portion of the previous instances, determine at least the third data prior to sending the second data to the second processing component.

18. The computing system of claim 13, wherein the at least one memory further comprises instructions that, when executed by the at least one processor, further cause the computing system to:

after sending the third data, represent, in storage, that the first data type was sent to the second processing component;

after representing the first data type in the storage, determine seventh data corresponding to the first data type;

after determining the seventh data, determine, using the storage, that the first data type was sent to the second processing component; and based at least in part on determining the first data type was sent to the second processing component, delete the seventh data without sending the seventh data to the second processing component.

19. The computing system of claim 13, wherein the at least one memory further comprises instructions that, when executed by the at least one processor, further cause the computing system to:

represent, in storage, that the first data type was sent to the second processing component;

determine seventh data corresponding to the user command, the seventh data corresponding to a third data type;

after sending the second data, send the seventh data to the second processing component;

represent, in the storage, that the third data type was sent to the second processing component;

after sending the seventh data, determine the first processing component is unable to send a further data type to the second processing component;

after determining the first processing component is unable to send the further data type, send, by the first processing component and to the second processing component, eighth data representing the first processing component is to send the plurality of data types to the second processing component; and after sending the eighth data and based at least in part on the first data type and the third data type being represented in the storage, send, by the first processing component and to the second processing component, the third data and the seventh data.

20. The computing system of claim 13, wherein the at least one memory further comprises instructions that, when executed by the at least one processor, further cause the computing system to:

upon the second processing component receiving the third data and prior to the first processing component sending the fourth data, processing the third data by the second processing component.

* * * * *